US011449370B2

(12) United States Patent
Laethem

(10) Patent No.: US 11,449,370 B2
(45) Date of Patent: Sep. 20, 2022

(54) SYSTEM AND METHOD FOR DETERMINING A PROCESS FLOW OF A SOFTWARE APPLICATION AND FOR AUTOMATICALLY GENERATING APPLICATION TESTING CODE

(71) Applicant: DotWalk, Inc., Solana Beach, CA (US)

(72) Inventor: Jared Matthew Laethem, Solana Beach, CA (US)

(73) Assignee: Dotwalk, Inc., Solana Beach, CA (US)

( * ) Notice: Subject to any disclaimer, the term of this patent is extended or adjusted under 35 U.S.C. 154(b) by 93 days.

(21) Appl. No.: 16/709,576

(22) Filed: Dec. 10, 2019

(65) Prior Publication Data

US 2020/0201689 A1 Jun. 25, 2020

Related U.S. Application Data

(60) Provisional application No. 62/778,170, filed on Dec. 11, 2018.

(51) Int. Cl.
*H04W 24/06* (2009.01)
*G06F 9/54* (2006.01)
*G06F 9/451* (2018.01)

(52) U.S. Cl.
CPC .............. *G06F 9/543* (2013.01); *G06F 9/451* (2018.02)

(58) Field of Classification Search
CPC .................. G06F 9/543; G06F 9/451
See application file for complete search history.

(56) References Cited

U.S. PATENT DOCUMENTS

| | | | |
|---|---|---|---|
| 7,437,614 B2* | 10/2008 | Haswell | G06F 11/3684 |
| | | | 714/E11.208 |
| 8,522,083 B1* | 8/2013 | Cohen | G06F 11/3696 |
| | | | 714/38.1 |
| 9,559,928 B1 | 1/2017 | Porter et al. | |
| 9,727,448 B1 | 8/2017 | Seibert, Jr. et al. | |
| 9,990,272 B2 | 6/2018 | Cooper et al. | |
| 10,621,077 B2 | 4/2020 | Wiener et al. | |
| 10,733,087 B2 | 8/2020 | Wiener et al. | |
| 10,757,137 B1* | 8/2020 | Roturier | H04L 63/1483 |
| 10,824,547 B2 | 11/2020 | Parbhane et al. | |
| 2004/0093538 A1 | 5/2004 | Hester et al. | |

(Continued)

*Primary Examiner* — Andy Ho
*Assistant Examiner* — Abdou K Seye
(74) *Attorney, Agent, or Firm* — McDonnell Boehnen Hulbert & Berghoff LLP

(57) ABSTRACT

A computer-implemented method of mapping a process model of a software application executed by a hosting platform. A series of actions taken by a user with respect to user interfaces generated by the software application are simulated through one or more application programming interface (API) calls. The user interfaces include a form and the series of actions includes opening the form. A plurality of user interface fields of the form are then identified through one or more other API calls executed while impersonating a session of a user under test. At least some of the user interface fields are set to known values and the form is submitted to the software application after the fields have been set. Changes to field-related and record-related information resulting from the submission are then gathered and a process model of the software application is determined based upon the gathered information.

21 Claims, 23 Drawing Sheets

(56) References Cited

U.S. PATENT DOCUMENTS

| | | | |
|---|---|---|---|
| 2005/0193269 A1* | 9/2005 | Haswell | G06F 11/3684 714/E11.208 |
| 2013/0174126 A1* | 7/2013 | Belihomji | G06F 11/3668 717/127 |
| 2015/0169158 A1 | 6/2015 | Kyte et al. | |
| 2015/0347278 A1 | 12/2015 | Sinha et al. | |
| 2017/0075791 A1* | 3/2017 | Ramakrishna | G06Q 10/06 |
| 2019/0317885 A1 | 10/2019 | Heinecke et al. | |
| 2019/0332790 A1* | 10/2019 | Kukehalli Subramanya | H04L 63/10 |
| 2021/0081308 A1 | 3/2021 | Golubev | |

\* cited by examiner

900

● Introduction ──── ● Base Table Selection ──── ❸ Table/User Combo Selection ──── ❹ View Configuration ──── ❺ Suite Configuration ──── ❻ Results

Select Table and Roles to Generate Tests For

ATF Bootstrap has analyzed your task table to determine unique combinations of table/roles you might want to generate tests for based on the past behavior of your users. The list below allows you to select the combinations based on the prevalence of a user with a certain combination of roles creating a record on each table. Check the combos you want to create a test for and then click the "Generate Tests" button

Table and Role Combinations

Follow On Task (cert_follow_on_task), Record count: 389
100% coverage

☑ Example User: System Administrator Count: 389
       admin

Group approval (sysapproval_group), Record count: 120
0% coverage

☐ Example User: System Administrator Count: 120
       admin

Change Request (change_request), Record count: 67
90% coverage

☑ Example User: System Administrator Count: 60
       admin

☐ Example User: ITIL User Count: 1
       app_service_user, certification, cmdb_query_builder, dependency_views, itil, template_editor, view_changer Problem (problem), Record count: 10
0% coverage Incident (incident), Record count: 10
0% coverage Catalog Task (sc_task), Record count: 1
0% coverage Requested Item (sc_req_item), Record count: 1
0% coverage Request (sc_request), Record count: 1
0% coverage

[BACK]    [NEXT: CONFIGURE VIEWS]

FIG. 9

*Example of a test suite consisting of generated tests.*

| < | ▦ Test Step
▦ Record Validation | | | | | 🖉 ☰ ○○○ | Update | Delete | ↑ ↓ |

| Execution order | 4 | | Application | Global | ⓘ |
| Active | ☑ | | ✱ Test | JDotWalk, ATF Bootstrap -- incident, ITIL Use | ⓘ |
| Timeout | Seconds | 0 | ✱ Step config | Record Validation | ⓘ |
| Description | Validate record from table 'incident' matches the following condition:
Active = true | | | | |

| Enforce security | ☑ | | | | ✱ |
| Assert type | Record successfully validated | | | | |
| ✱ Table | Incident [incident] | | | ▼ | ✱ |
| ✱ Record | Step 5: Submit a Form > Record ✕ | | | | ✱ |
| ✱ Field values | Add Filter Condition | Add "OR" Clause | | | |
| | Active ▼ | is | true | ✱ | AND | OR | ✕ |

| Update | Delete |

*Example detailed view of an individual test step in the test shown above*

| < | Client Test Runner | |

Performing other activities while tests are being executed can result in those activities being performed by the currently executing user and could be rolled back.

Running step 3 of 4 for DotWalk, ATF Bootstrap – incident, ITIL User

Your connection status is [ Connected ]
Currently executing as [ ITIL User ]
UI Batches Executed [ 0 ]

Taking screenshot and sending it to server

Execution Frame

| < | Incident ~ INC0010045 | ⬚ Submit  Resolve |

| Number | INC0010045 | Contact type | -- None -- |
|---|---|---|---|
| * Caller | Carol Coughlin | State | New |
| Category | Recent selections  Carol Coughlin carol.coughlin@example.com | Impact | 3 - Low |
| Subcategory | -- None -- | Urgency | 3 - Low |
| Business service | | Priority | 5 - Planning |
| Configuration item | | Assignment group | |
| | | Assigned to | |
| * Short description | SAP Sales app is not accessible | | |
| Description | | | |

FIG. 20

SYSTEM AND METHOD FOR DETERMINING A PROCESS FLOW OF A SOFTWARE APPLICATION AND FOR AUTOMATICALLY GENERATING APPLICATION TESTING CODE

CROSS-REFERENCE TO RELATED APPLICATIONS

This application claims the priority benefit, under 35 U.S.C. 119(e), of U.S. Application No. 62/778,170, entitled "SYSTEM AND METHOD FOR DETERMINING A PROCESS FLOW OF A SOFTWARE APPLICATION AND FOR AUTOMATICALLY GENERATING APPLICATION TESTING CODE", and filed on Dec. 11, 2018. The aforementioned application is incorporated herein by reference in its entirety.

BACKGROUND

Software as a service platforms or PaaS, allow customers to implement an application or business process as a collection of database schemas with associated views and rules for behavior of the user interface and side-effects for records/objects in the database related to actions taken in the user interface.

There exist two vectors for changes to applications, explicit changes to the application and changes to the SaaS platform. Changes to the SaaS platform are authored by the vendor of that SaaS platform while changes to the application itself are authored by the customers of the vendor who have implemented their organization's specific processes on the SaaS platform. Once an application has been implemented on a SaaS platform the general expectation is that the application should continue to behave in the way it was implemented even as the platform itself is upgraded.

SaaS vendors have policies in place that make upgrades mandatory for customers. This is because they generally encourage customers to utilize newer code versions in order to ensure that customers are running with fixes for security vulnerabilities, that customer support organizations are not burdened with supporting old versions and that customers can buy new products only compatible or available with newer versions of the platform.

Every upgrade to the SaaS platform by the vendor poses risk of regression for customers utilizing the platform. A regression can result because a net-new defect is present in the new version of the SaaS vendor's platform but also for more subtle reasons. Even if the SaaS vendor just changes behavior this will manifest as a defect for the customer if they have come to rely on the old behavior. Changes to platform API's may make a customer's code incompatible with the new release thus resulting in errors and/or changes in application behavior. Additionally, depending on the ways in which a SaaS vendor exposes extensibility points in their platform there are additional risks. The vendor of the platform may allow modification to their out-of-the-box code, that defines platform or base application functionality. If so, when changes are made by the SaaS vendor it may necessitate, on the part of the customer, doing a code merge. If the merge is not performed correctly it can result in regression. Doing these types of merges is error prone. The difficulty is compounded by the reality that the person merging the code didn't write the new version coming from the SaaS vendor but also oftentimes may not have written the customization to the vendors code or even be familiar with its intent.

Customers of a SaaS platform often implement significant functionality. However, such customers generally do not utilize automated tests that would help them detect unintended consequences of changes they are explicitly making to their implementation or applications. Creating automated tests that essentially would just describe what they currently have is quite difficult and time-consuming. While users may be using the application every day to fulfill their duties, the administrators and developers of the SaaS platform at that company may not have sufficient knowledge of what was originally implemented and what behaviors the users rely on. The individuals who implemented the application may not work at the company any more or may have been a consultant who never worked at the company. Just discovering this information by analyzing code, interviewing users or documenting current behavior, as a prerequisite to writing good automated tests, is likely to be time consuming to the point of being cost prohibitive.

SUMMARY

An effective way to manage the risk associated with the constant changes to applications running on a SaaS platform or to the platform itself is through testing. Only through effective testing can it be ensured that applications running on the PAAS are running as expected.

A system which automates any part of this testing can provide significant value. Once the application is in production, getting used every day by users, current functionality needs to be maintained. Disclosed herein is a system that describes current functionality pre-change and then validates that the functionality still exists. As a consequence, the system of the disclosure is able to streamline the heavy burden of manual testing or manual creation of automated tests. Applications developed on a PAAS or other software framework lend themselves to this type of testing because of the separation of platform and application functionality. Business process is implemented as a composition of platform metaphors for common types of process: a form field is present in a particular view, required under certain conditions or maybe read-only. When a form is submitted with some arbitrary list of values set then business logic implemented by a customer states other records are inserted or fields set. These rules constitute the customer's business process or process model, which is generally desired to be maintained after the upgrade of the SaaS platform. Such rules are discoverable and describable in accordance with the teachings herein. Finally, the rules defining the process model are testable if described before and after the change and then compared in accordance with the present disclosure.

Although conventional automated tests may be manually created by testing engineers, by automating not just test execution but also the generation of the tests it is possible to reduce the work necessary to test a change. As a consequence, the time of testing professionals may be reallocated to other types of testing, thus resulting in greater overall coverage and reduced risk of regressions in the software applications being tested.

In one aspect the disclosure is directed to a computer-implemented method of mapping a process model of a software application executed by a hosting platform where the software application is based on a plurality of records. The method includes simulating, through one or more application programming interface (API) calls, a series of actions taken by a user with respect to user interfaces generated by the software application The user interfaces include at least a form and the series of actions includes opening the form. The method further includes identifying, through one or more other API calls executed while impersonating a session of a user under test, a plurality of user interface fields of the form. The series of actions further includes setting at least some of the user interface fields to known values and submitting the form after the fields have been set. Field-related information resulting from the setting of the user interface fields is then gathered. Record-related information corresponding to one or more effects on the plurality of records resulting from the submission of the form is also gathered. The process model of the software application is then determined based upon the field-related information and the record-related information.

In one implementation the act of identifying the user interface fields includes identifying one or more visible fields, one or more mandatory fields, and one or more read-only fields. This may further include identifying one or more available actions and may also include identifying current field values of the user interface fields.

The method may include identifying the mandatory fields included within the user interface fields and setting only the mandatory fields to known values.

The simulated series of actions may be included within a plurality of scenarios, each of the plurality of scenarios being automatically generated based upon one of a plurality of scenario specifications. At least one of the scenario specifications may include information specifying which objects of the software application are to be tested with respect to at least one of a set of users or a set of user groups.

In a particular implementation the known values to which the user interface fields are set are obtained from historical data relating to prior usage of the software application.

The disclosure also relates to a computer-implemented method of automated testing of a software application executed against a hosting platform. The method includes determining a process model of the software application based upon user interface (UI) field-related information and record-related information. This information is obtained by simulating, through one or more application programming interface (API) calls, a series of actions taken by a user with respect to one or more user interfaces generated by the software application when executing on a first version of the hosting platform.

A test of the software application is then automatically generated based upon the process model. The software application may then be tested in accordance with the test when the software application is executing on a second version of the hosting platform.

In one implementation of the automated testing method, the one or more user interfaces utilized during the simulation include at least one form and the series of actions includes opening the form.

The stage of determining the process model of the software application may involve performing a number of tasks. For example, a plurality of user interface fields of the form may be identified through one or more other API calls. In this case the series of actions further includes setting one or more of the user interface fields to known values and subsequently submitting the form. Field-related information resulting from the setting of the user interface fields may then be gathered. In addition, record-related information corresponding to one or more effects on the plurality of records resulting from the submission of the form may also be gathered.

In one implementation of the automated testing method, the act of identifying the user interface fields includes identifying one or more visible fields, one or more mandatory fields, and one or more read-only fields. This may further include identifying one or more available actions and may also include identifying current field values of the user interface fields.

The automated testing method may include identifying the mandatory fields included within the user interface fields and setting only the mandatory fields to known values.

The simulated series of actions may be included within a plurality of scenarios, each of the plurality of scenarios being automatically generated based upon one of a plurality of scenario specifications. At least one of the scenario specifications may include information specifying which objects of the software application are to be tested with respect to at least one of a set of users or a set of user groups.

In a particular implementation of the automated testing method, the known values to which the user interface fields are set are obtained from historical data relating to prior usage of the software application.

The automated testing method may include executing a plurality of pass/fail tests. The testing method may further include (i) recording test results resulting from the testing of the software application, and (ii) detecting a regression in the software application by identifying one or more differences between the test results and initial simulation results comprised of the UI field-related information and the record-related information.

BRIEF DESCRIPTION OF THE DRAWINGS

The present application may be more fully appreciated in connection with the following detailed description taken in conjunction with the accompanying drawings, wherein:

FIGS. 5-11 are screenshots of exemplary user interfaces generated by the test specification/generation user interface during a scenario specification phase.

FIG. 17 is a screenshot of a user interface produced by a test generation user interface which illustrates a test suite consisting of generated tests produced by the test generation system of the disclosure.

FIG. 18 is a screenshot of a user interface produced by the test generation user interface which shows an example of a test generated by the test generation system of the disclosure.

FIG. 19 is a screenshot of a user interface produced by the test generation user interface which shows a detailed view of test step Record Validation included within the test shown in FIG. 18.

FIG. 20 is a screenshot of a user interface generated by the test generation user interface that is associated with test execution within a separate test execution environment.

DETAILED DESCRIPTION

Architecture

In one embodiment the test generation system of the present disclosure is architected to support the impersonation of a human user of an application being tested and the collection of results of simulated interaction of the impersonated user with the application. More specifically, the test generation system is implemented in an execution environment and is preferably configured to impersonate users, take actions in user interfaces accessible to such users, and gather simulation information about the system behavior resulting from execution of the application on a first version of a hosting platform. A process model of the application may then be determined based upon the simulation information. Tests created by the test generation system may be loaded in the same, or a different, execution environment.

Figure 1A:
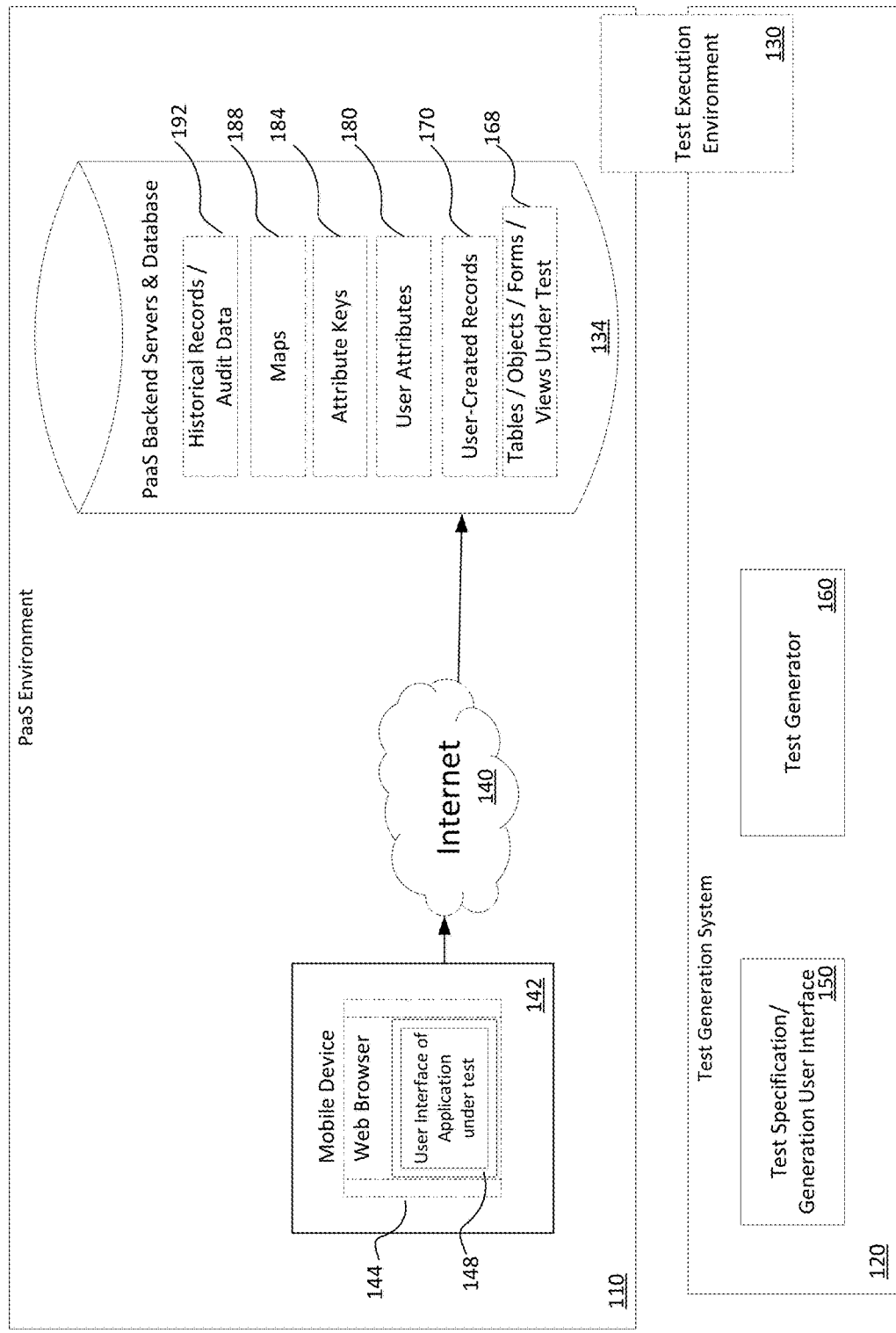
FIG. 1A illustratively represents an exemplary architecture of a test generation system configured to automatically test an application written on a SaaS platform.

In one embodiment the software application is tested on a second version of the hosting platform and resulting test results are recorded. A regression or other defect in the software application may then by determined by identifying one or more differences between the recorded test results and the simulation information Architecture: Execution Environment Attention is directed to FIG. 1A, which illustratively represents an exemplary architecture of a test generation system 100 configured to automatically test an application 148 written on a SaaS platform. The system 100 includes a PaaS environment 110, a test generation system 120 and a test execution environment 130. As shown, the PaaS environment 110 includes a PaaS backend server(s) and database arrangement ("PaaS backend") 134 in communication through a network 140 such as the Internet with a mobile device 142 executing a Web browser 144. During operation of the system 100, the Web browser 144 renders a user interface 149 of the application 148 being tested.

In one embodiment the test execution environment 130 runs within the PaaS environment 110. Alternatively, the test execution environment 130 can run in a stand-alone execution environment separate from the PaaS environment 110. Implementations of the test execution environment 130 within the PaaS environment 110 can leverage, to the extent that they are available, extensibility points provided by the platform. Some implementations of the PaaS environment 110 provide close to unlimited support for extensibility, in the form of the ability to inject arbitrary code that should be executed on the PaaS backend server(s) and database arrangement 134 and on the mobile device 142 and/or Web browser 144. Other SaaS/PaaS may be more limited in the extensibility points they expose, perhaps only providing customization through GUI's (not code).

If the PaaS environment 110 provides a fully functional code execution environment, then the test generation system 120 can be hosted in the PaaS environment 110; otherwise, the test generation system 120 is hosted separately from the PaaS environment 110. The implementation is similar in either case. The test generation system 120 leverages a custom webpage (HTML and client-side JavaScript) as the entry-point to generating tests. The page hosts a test specification user interface 150 for selecting what tests to create. Once the tests to be created have been specified this same page hosts the information gathering functionality. In one embodiment the information gathering works by opening the pages to be tested in an iframe that can be controlled from the outer frame. The iframe is pointed to the form or other page to be tested. JavaScript embedded in the outer page automates the actions taken on the page being tested. Actions are taken against the page and information is gathered, all via API calls made from the outer frame against the iframe. This information is collected and used during scenario generation eventually resulting in the test generator 160 generating a test in the test execution environment 130. The server execution environment for the test generation system 120, if not running on the PaaS environment 110, may be any back-end for Web applications. The main requirement is that such a server execution environment should be capable of serving HTTP requests as well as integrating with the test execution environment 130 for the purpose of loading tests.

Figure 1B:
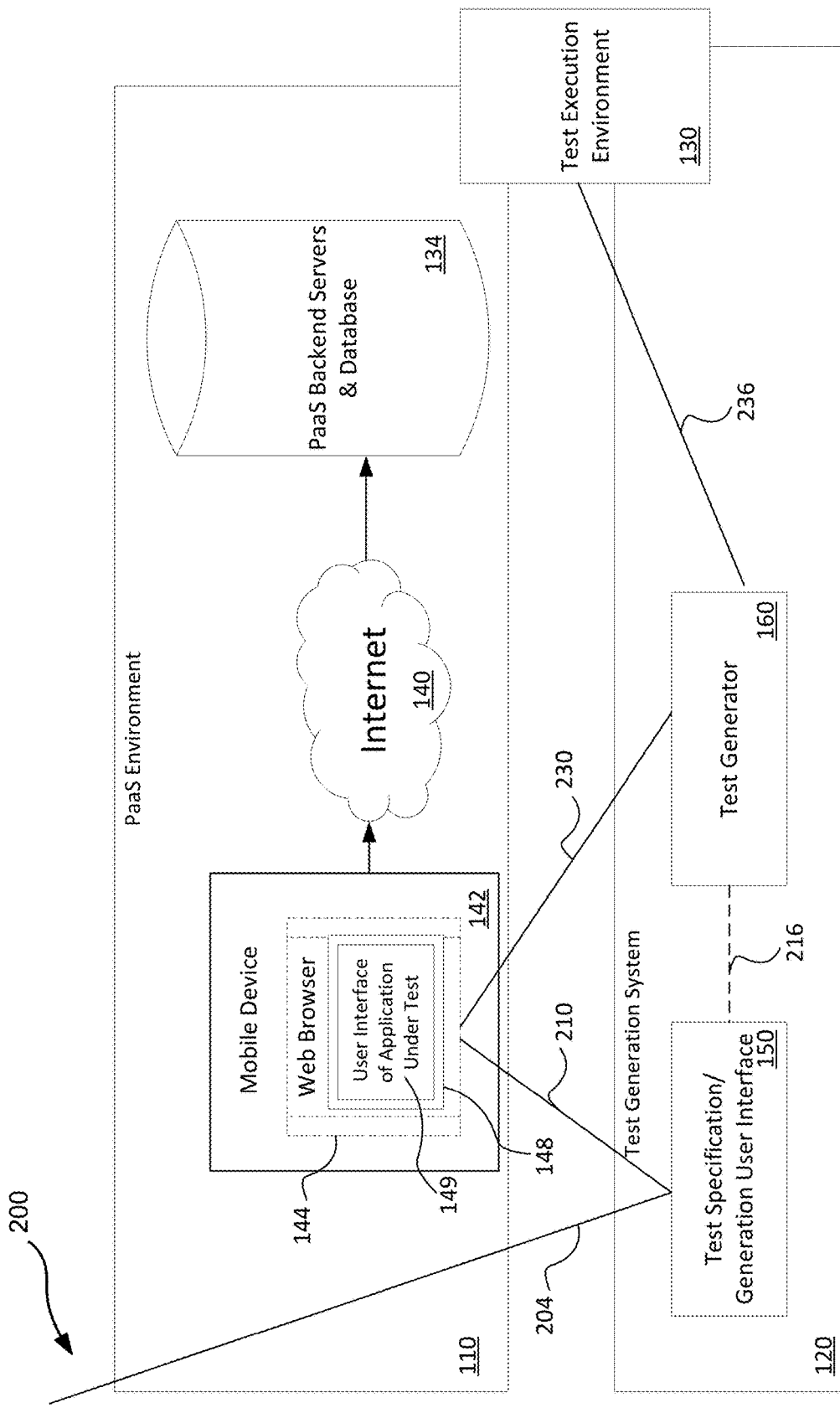
FIGS. 1B and 1C illustrate an exemplary process flow associated with the test generation system of the present disclosure.
Figure 1C:
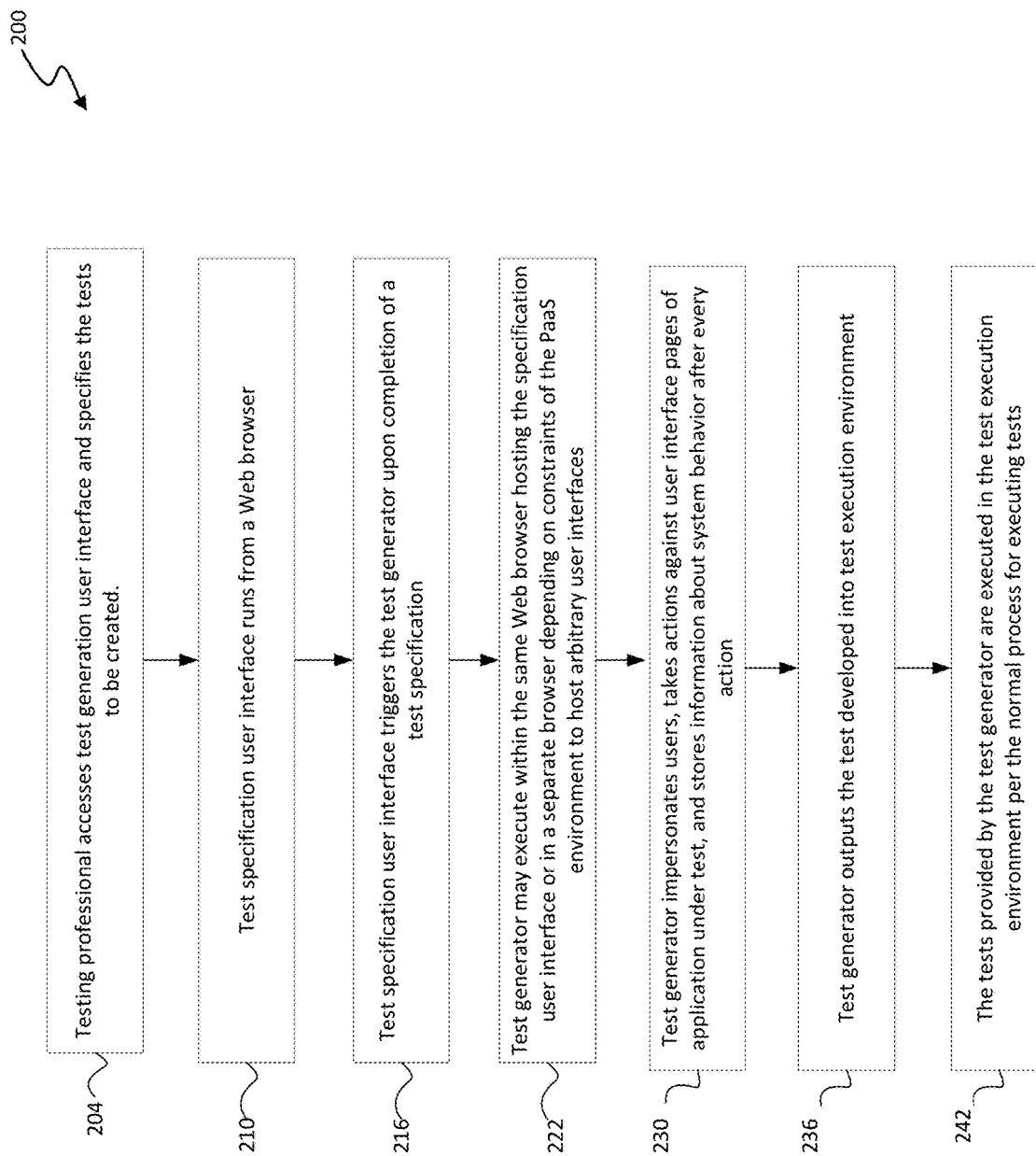

FIGS. 1B and 1C illustrate an exemplary process flow 200 associated with the test generation system 100 of the present disclosure. Specifically, FIG. 1B illustrates the process flow 200 within the context of the architecture of the execution environment 100 of FIG. 1A, while FIG. 1C is a flowchart representative of the process flow 200.

As shown in FIGS. 1B and 1C, the process flow 200 may be initiated when a testing professional or other user accesses the test specification user interface 150 and specifies the tests to be created (stage 204). In one embodiment the test specification user interface 150 runs from the Web browser 144 or from another Web browser within the PaaS environment 110 (stage 210). Upon completion of a test specification, the test specification user interface 150 triggers the test generator 160 (stage 216). The test generator 160 may execute within the same Web browser hosting the test specification user interface 150 or in a separate Web browser depending on constraints of the PaaS environment 110 to host arbitrary user interfaces (in cases in which the PaaS environment 110 hosts the test generation system 120) (stage 222). The test generator 160 then proceeds to impersonates users, takes actions against user interface pages 149 of the application under test 148, and stores information about system behavior after every action (stage 230). The test generator 160 also outputs the test which it has developed into the test execution environment 130 (stage 236). In one embodiment the test is comprised of a sequence of steps where some or all of the steps consist of actions and assertions as determined during test generation. The test provided by the test generator 160 is then executed within the test execution environment 130 in the same way in which other tests would be executed (stage 242).

Figure 2:
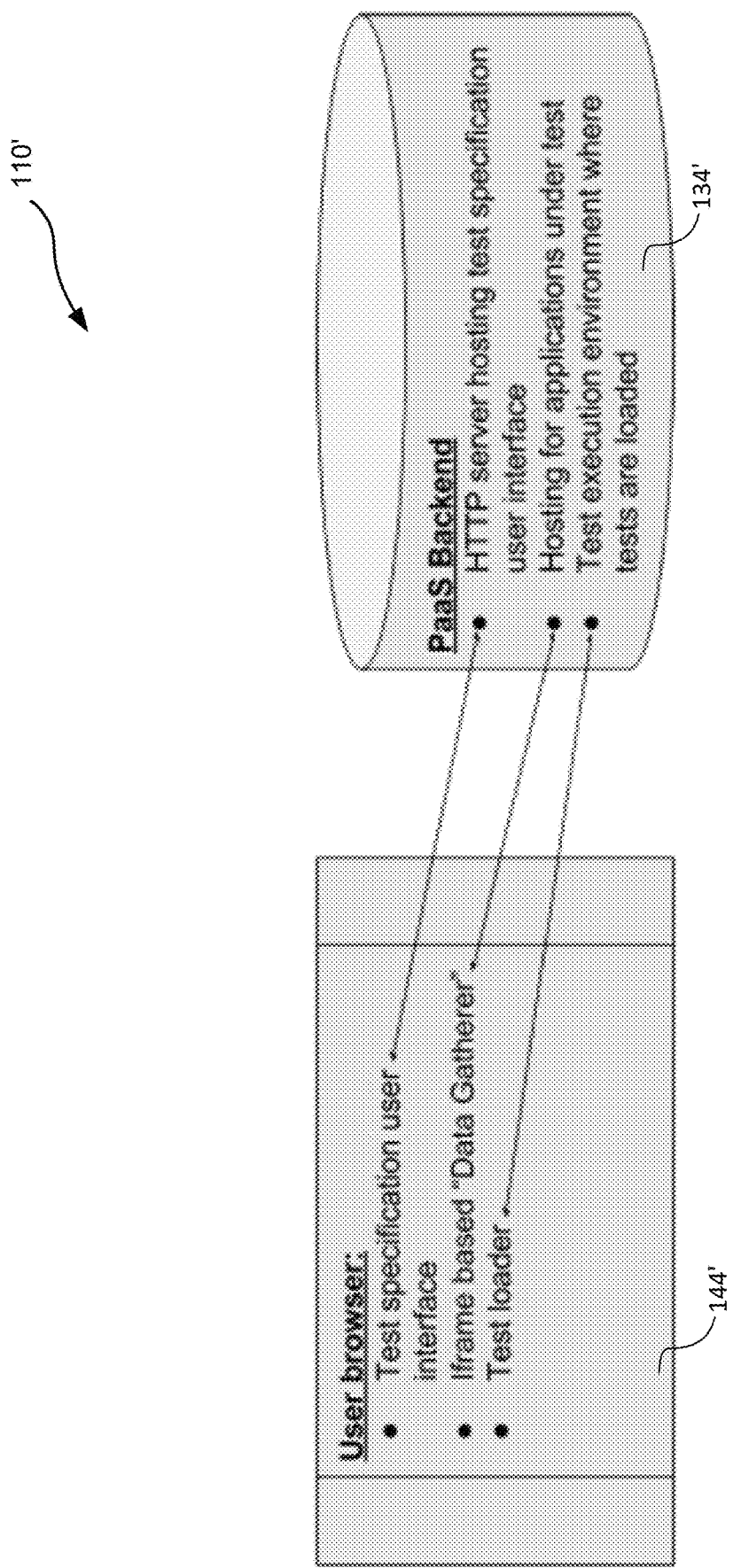
FIG. 2 is a diagram of an exemplary architecture of a PaaS environment lacking constraints on hosting arbitrary code or custom applications.

FIG. 2 is a diagram of an exemplary architecture of a PaaS environment 110' lacking constraints on hosting arbitrary code or custom applications. In the architecture of FIG. 2 the PaaS backend 134' is configured to provide the test execution environment.

Figure 3:
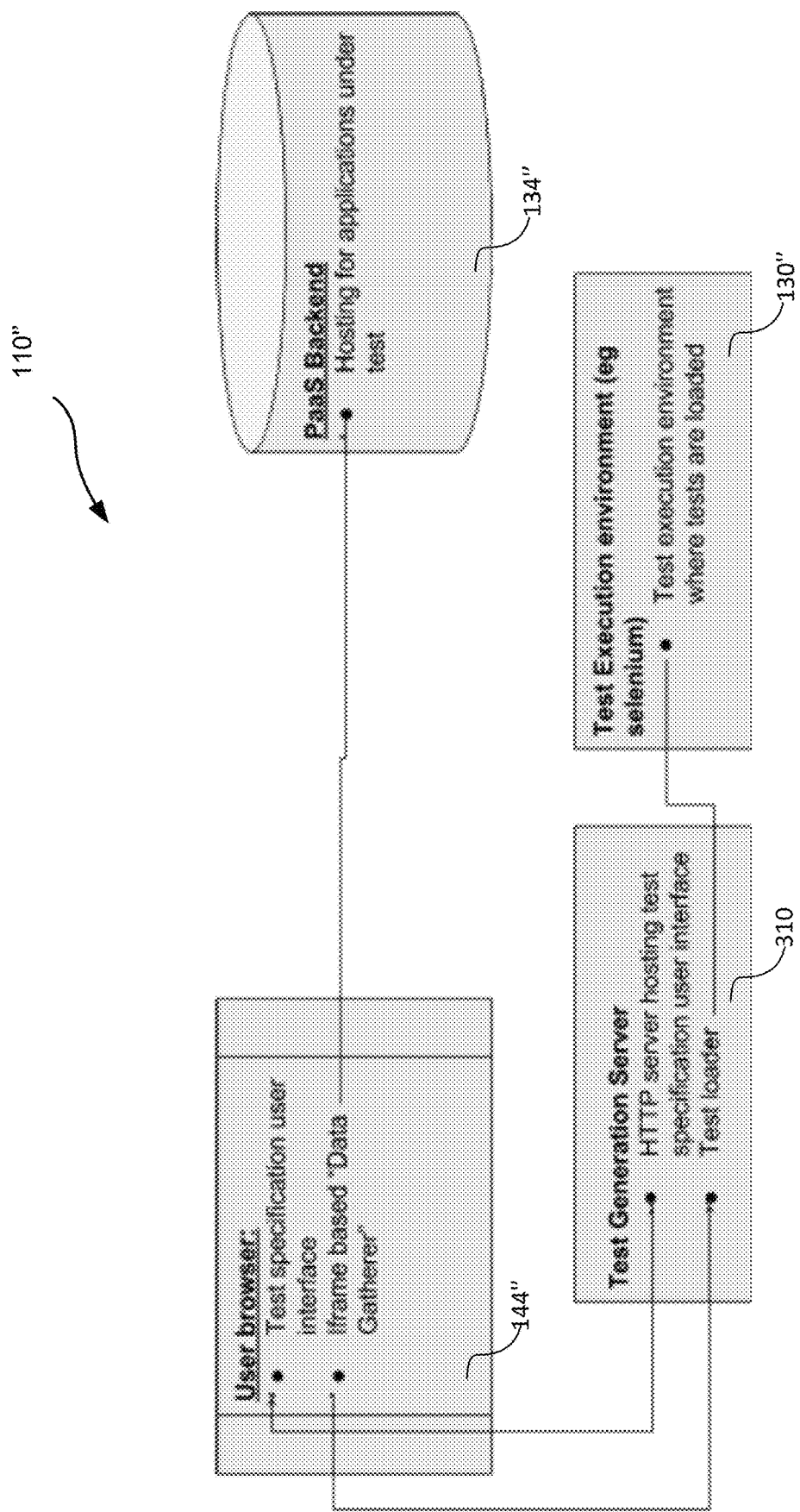
FIG. 3 is a diagram of an alternative exemplary architecture of a PaaS environment that is configured to neither allow hosting of custom code applications nor provide a test execution environment.

FIG. 3 is a diagram of an alternative exemplary architecture of a PaaS environment 110" that is configured to neither allow hosting of custom code applications nor provide a test execution environment 130". In this configuration a separate HTTP test generation server 310 is used to host the test generation system 120. In addition, the test generation system 120 writes tests into a standalone off-the-shelf test execution environment 130" (e.g., a Selenium environment).

Architecture: User Impersonation

In one embodiment the test generation makes heavy use of impersonation of users on the PaaS. The only requirement is the need to setup a session with the PaaS for a given user. If the PaaS environment provides the ability to impersonate another user as a feature than the test generation system can just use it. Otherwise it can be accomplished by automating the interactions with a login form. In the absence of an impersonation feature the system can set the password of the user it needs to impersonate and then instruct the iframe where test generation is running to access the login page, enter the username and password at which point the session cookie for the iframe will be set for the user to be impersonated. At this point the test generation system can navigate user interfaces with the permissions (behavior and access level) of the user being impersonated. Some PaaS implement extensibility points for controlling user authentication. This may also provide an option for implementing impersonation without necessitating manipulating passwords attached to user accounts. Finally depending on constraints of the PaaS relative to browser cross-site scripting security constraints it may be necessary to use two separate web browsers, one hosting the user interface for Scenario Specification and the other, remote controlled actually doing information gathering.

Architecture: Historical Data, Audit Logs and Record Created/Updated Date Stamps In one embodiment the test generation system makes use of historical data and audit logs in order to inform the test generation process. Historical data is referenced for providing valid form inputs that are known to have passed data-validation rules in the past. During record validation audit data is used to identify when a field was set so that record validations are limited to asserting only against field values set as a result of an action taken against the record under test.

Most PaaS systems have built-in audit logs and allow programmatic access. In a system with audit logs they are used as provided by the PaaS. In the absence of audit logs built into the PaaS the audit logs can be implemented from scratch to meet the requirements of the test generation system.

Architecture: PaaS APIs, Required Extensibility Points and Workarounds

Form API's

Schema APIs

Record APIs

Architecture: Test Loading

Test loading will vary depending on the test execution environment.

Figure 4:
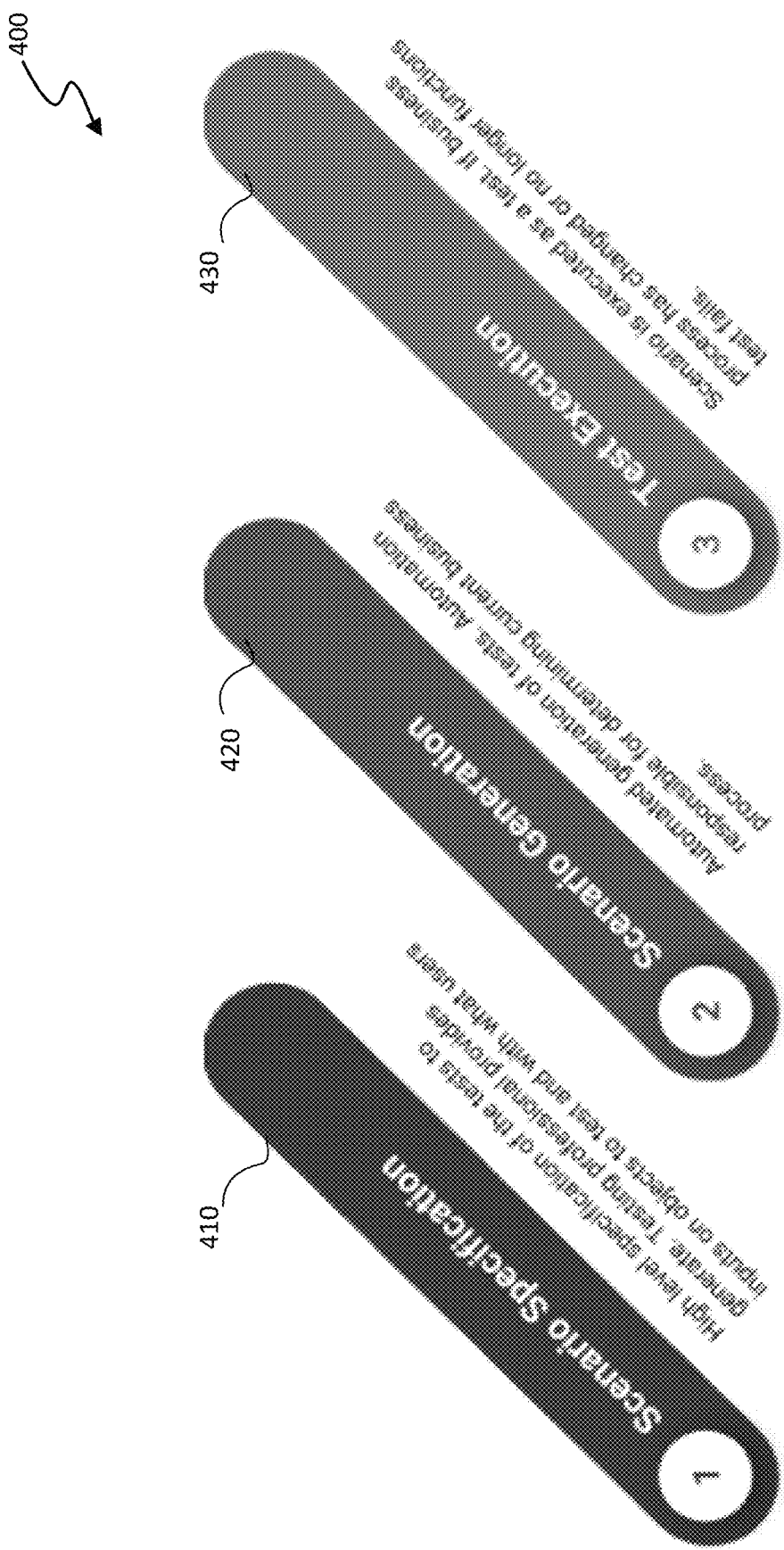
FIG. 4 provides a high-level representation of principal phases of an automatic test generation process in accordance with the disclosure.
Figure 5:
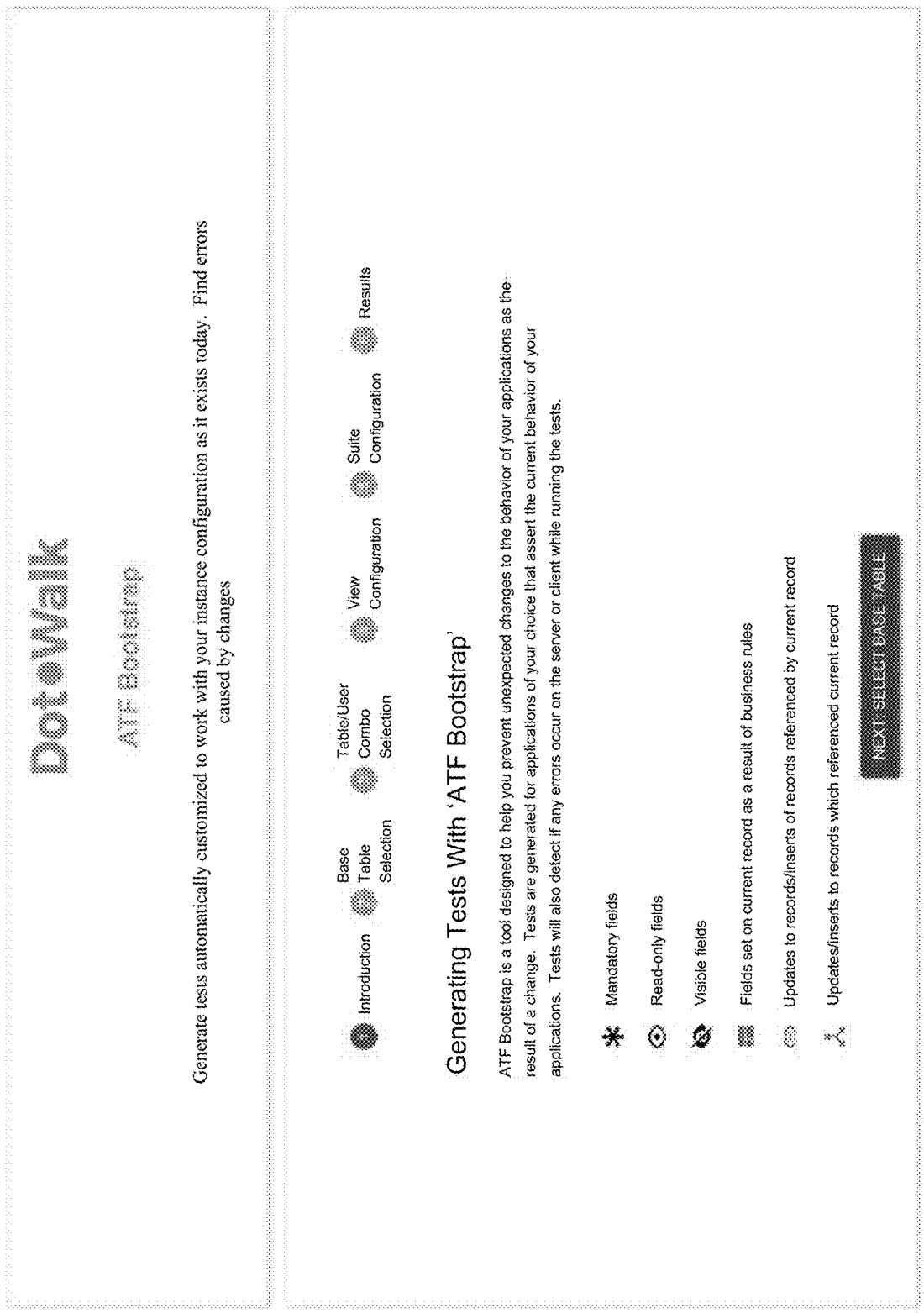
Figure 6:
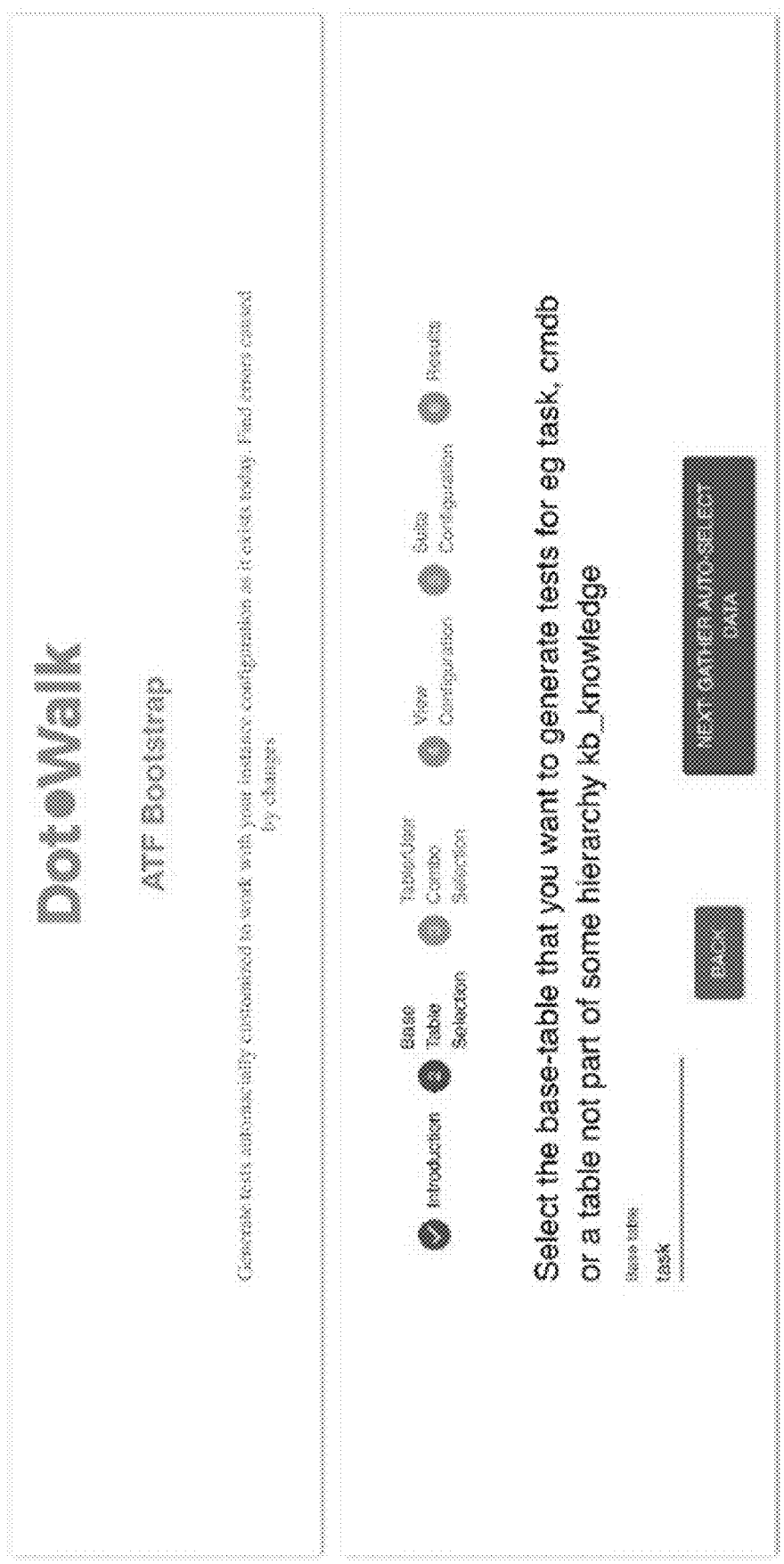

Attention is now directed to FIG. 4, which provides a high-level representation of principal phases of an automatic test generation process in accordance with the disclosure. As shown in FIG. 4, these sequential phases include a scenario specification phase 410, a scenario generation phase 420 and a test execution phase 430. In the scenario specification phase 410, a testing professional provides a high level specification of the tests to be generated. Specifically, the testing professional provides inputs identifying objects 168 to test with respect to specified users. The scenario generation phase 420 includes automated generation of tests based upon the test specifications provided during the scenario specification phase 410. In one embodiment a principal objective of the automated tests generated during this phase is determination of the current business process associated with the application under test 148. The test execution phase 430 includes executing a scenario developed during the scenario generation phase 420 as a test. The scenarios generated during the scenario generation phase 420 are preferably generated such the test scenario fails upon execution if the business process associated with the user interfaces 149 of the application 148 being tested has changed or is no longer functional.

As is discussed further below, FIGS. 5-11 are screenshots of exemplary user interfaces generated by the test specification/generation user interface 150 during the scenario specification phase 410.

Scenario Specification

Figure 7:
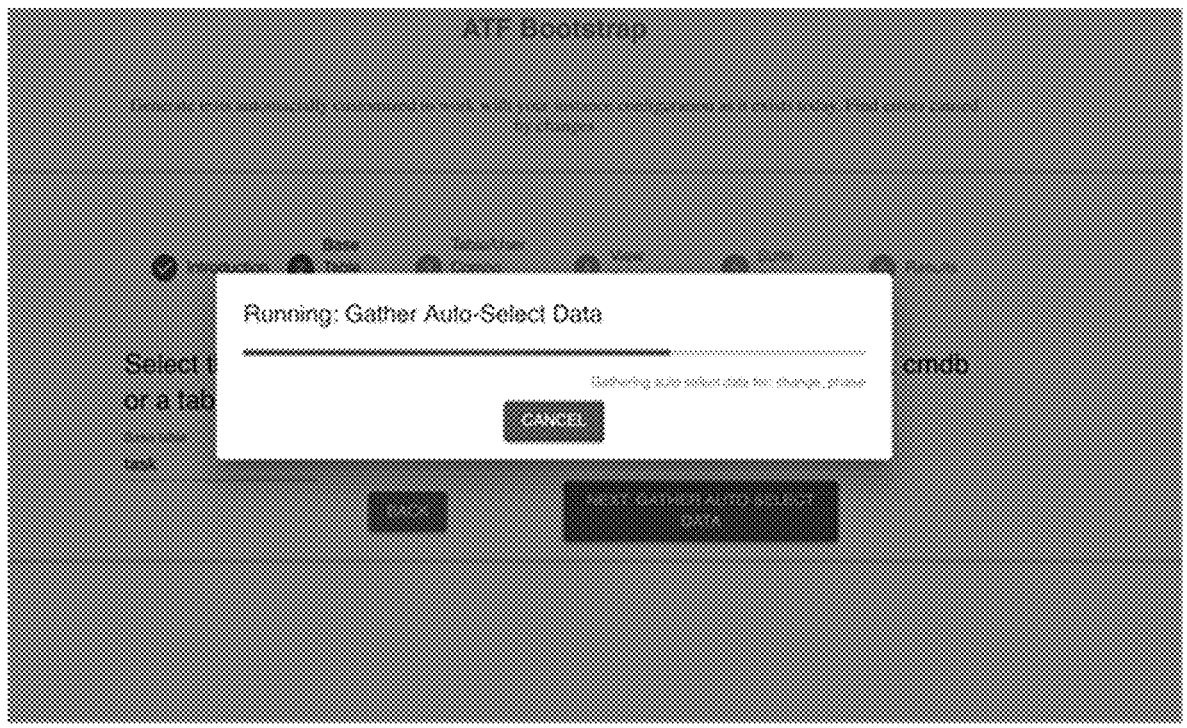
Figure 8:
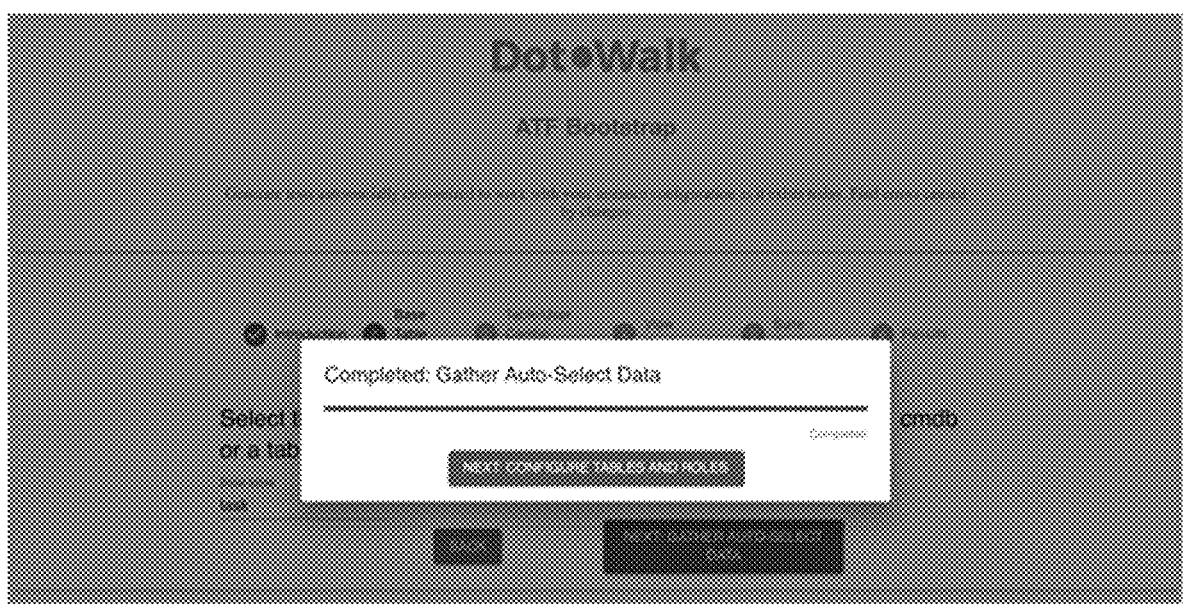

As discussed above with reference to FIG. 4, a first step in one embodiment of the disclosed automated test generation process is specification of the scenarios for which tests should be generated (stage 410). Generating tests with the system first requires input for what object, table or form and view/s 168 of the application 148 are to be tested. See, e.g., FIGS. 5 and 6, which are exemplary user interfaces presented by the test specification user interface 150 through which base-tables of the application 148 may be selected for testing. FIGS. 7 and 8 are exemplary user interfaces presented by the test specification user interface 150 during gathering of data relating to the selected base-tables.

FIG. 9 is a screenshot of the exemplary user interface 900 generated by the test specification user interface 150 which presents various selectable table and role combinations selectable from which tests may be generated.

Figure 10:
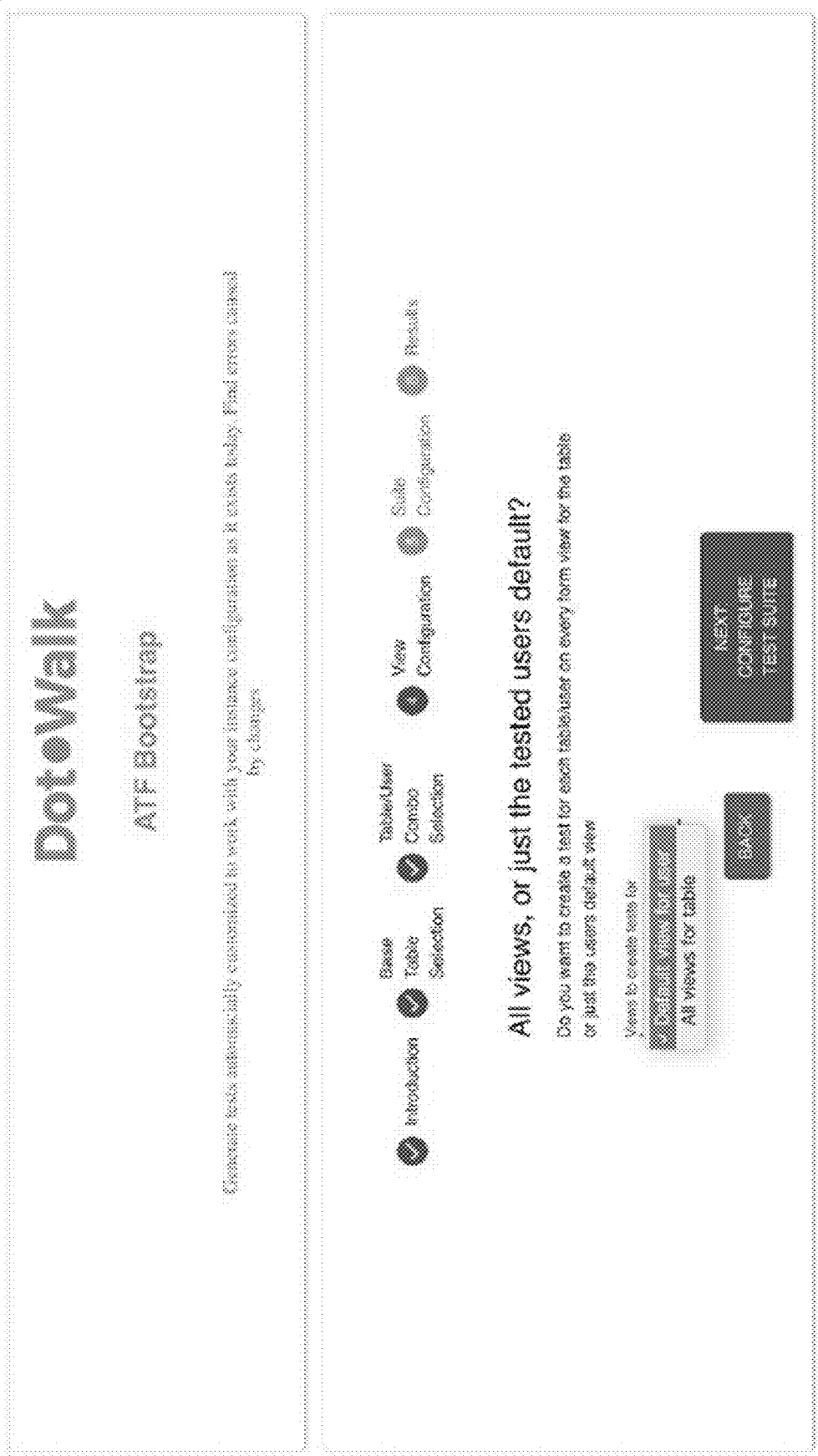

As shown in the user interface of FIG. 10, in one embodiment the testing professional may specify whether a test is to be created for each table/user on every form view for the table or just for the default view of the user.

Another key variable to be specified for each scenario is the set of users that should be impersonated when testing. Different user accounts will have different privileges in the application under test 148 depending on, for example, security rules (access controls) and the access levels assigned to the user (roles).

Figure 11:

Referring to the exemplary user interface of FIG. 11, in one embodiment a new test suite is created based upon the scenario specification parameters provided by the testing professional.

Scenario Specification: User Grouping

By grouping users by their roles the test generation system 120 streamlines scenario specification. User grouping starts from the table or object under test 168 specified through the test specification user interface 150. In one embodiment the system 120 issues a group-by query to the PaaS backend 134 in order to divide recently created records 170 by the user responsible for creating the record and select the count of records 170 created as a result of activity by that user. Next, for each user the system 120 queries user attributes 180 for that user. Relevant attributes could be anything tied to a user likely to affect behavior of the application 148, but generally relates to their security roles or permissions. Attributes are serialized and used to generate a key 184 that can be used to index into a map 188. For each user a map 188 is queried by the user attribute key 184, if there already exists an entry in the map 188 for the user attribute key then the count of records 170 created for that user is added to the existing total for that map entry. Otherwise a new entry is created in the map 188 for that key 184 with its starting value for the count set equal to the count for the current user. An overall total count of records 170 is also tracked. After all users have been indexed into the map 188 by their user attributes, the map 188 is transformed to a list of groupings sorted by count. Each list entry contains: a user readable definition of the key (list of roles), count, percent of total count (calculated by dividing the count for the group by the overall total count), and an example user that matches to the key.

The example below provides a scenario specification for a table "incident" of an application 148 under test in which users are grouped by their roles. The specification is for a test based on a unique combination of roles that a user inserting a record to a given table has.

```
"table": "incident",
"tableLabel" : "Incident",
"roleGroups": [
    {
        "table" : "incident",
        "roleCombo": "b3dd3ccec32203003e76741e81d3ae95,
ba4509c60a00070400cc0f3a60a0d30a, 45af8773d7002200cled0fbcSe61037a,
14fa2dc39f230200ee6219eb552e7006, 282bflfac6112285017366cbSfB67469,
21a8f3e581171300aadba4a47c598ece, 8a454be00a0a0b8c00de7dae26869165"
        "roleComboDisplay" : "app_service_user, certification, cmdb_query_builder,
dependency_views, itil, template_editor, view_changer",
        "roleGroupCount" : 8,
        "exampleUsersName" : "ITIL user",
        "exampleUsersSysId" : "ITIL User",
        "selected" :false
    },
    {
        "table": "incident",
        "roleCombo" : "2831a114c611228501d4ea6c309d626d",
        "roleComboDisplay" : "admin",
        "roleGroupCount" : 1,
        "exampleUsersName": "System Adimistrator",
        "exampleUsersSysid" : "6816f79cc0a8016401c5a33be04be441",
        "selected" : false
    }
},
"tableCount":12
```

Scenario Specification: Inputs Selection

While it may be desirable to generate tests for all possible scenarios, it is more than likely necessary to set some limits because there are typically simply too many possible combinations of input variables to feasibly test all possible combinations. Given that it may not be practical to run or maintain tests for all possible scenarios, embodiments of the system 120 facilitate scenario specification by prioritizing groupings of tables and users with the same roles, sorting based on historical number of records 170 created by users with that grouping of roles on that table.

Because the system 120 has information about past trends the user is able to make its determination of what tests to generate with relevant test coverage information expressed as a percent for each grouping, where the percent relates what percentage of historical records this scenario is representative of.

Scenario Generation

Figure 12:
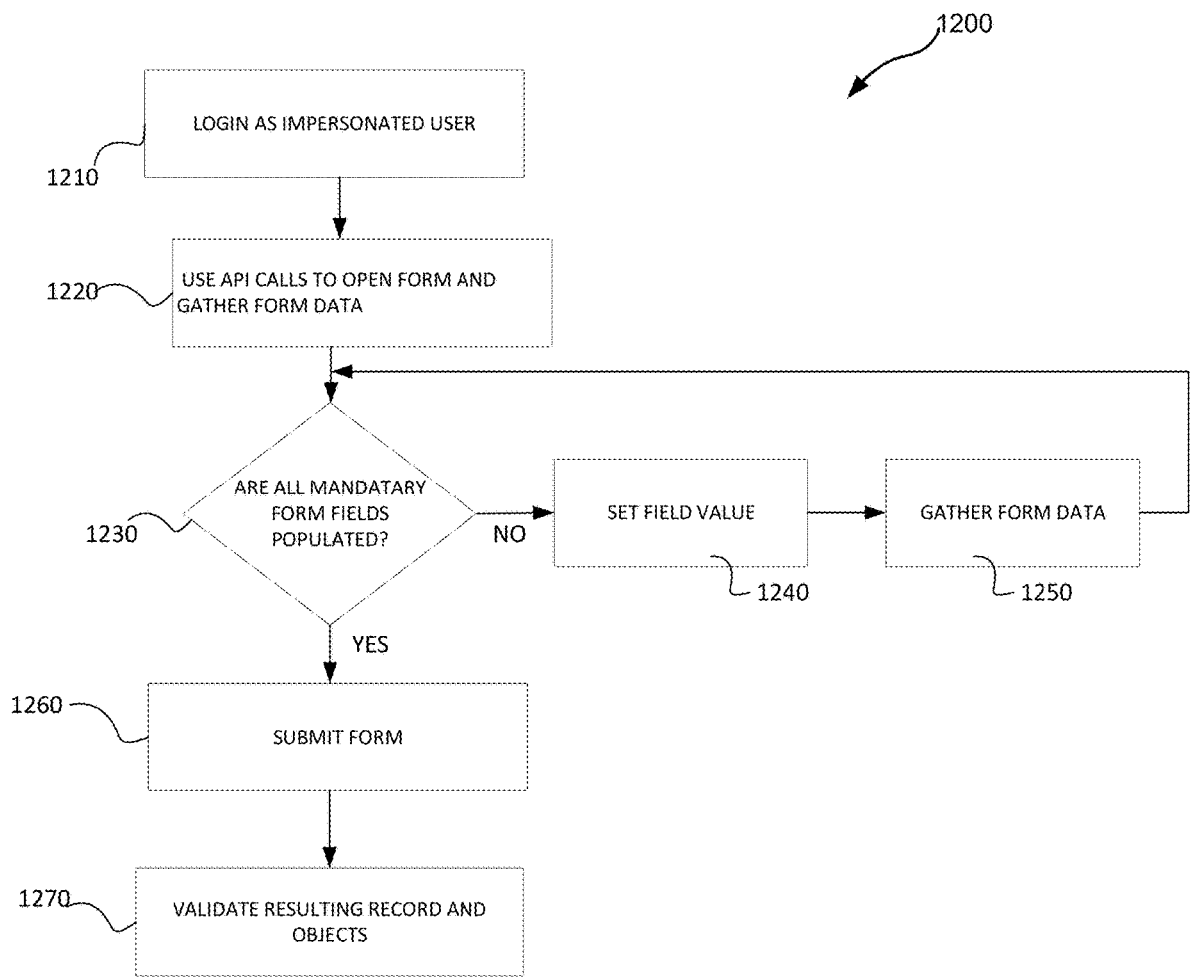
FIG. 12 is a flowchart of a sequence of operations performed during a scenario generation phase in accordance with the disclosure.

Turning now to FIG. 12, a flowchart is provided of a sequence of operations 1200 performed during a scenario generation phase in accordance with the disclosure. In one embodiment the test generator 160 initiates the scenario generation phase starts by logging in to the application under test 148 as an impersonated user (stage 1210). The process of test generation during the scenario generation phase continues by leveraging API calls to gather information about the form or other user-interface being targeted by the test and automatically simulating the interactions of the impersonated user through API calls. For each action capable of being taken by the impersonated user, the test generator 160 can simulate that action. For example, it is possible to simulate actions through API calls corresponding to, for example, "Open a form", "Set a value to a field", or "Click a button". We can determine the effect of an action also by making API calls. Each time we take a step we gather relevant information to determine the effect of that step. A typical flow for a form user-interface is 1) Open the form and gather information concerning: visible fields, mandatory fields, read-only fields, available actions (buttons) and current field values (stage 1220); 2) Determine if values have been set for all mandatory fields (stage 1230) and, if not, set a mandatory field value (stage 1240) and then again gather form information (stage 1250) as was initially done in stage 1220; 3) Keep setting all mandatory fields and gathering data until the form has been filled out with a minimal amount of information (stage 1230); 4) Submit the form (stage 1260); 5) Validate the resulting record 170/objects 168, as discussed further below (stage 1270).

As used herein, the term "mandatory field" means a field on a form that must be filled in in order for the form to be submitted to the application 148. As used herein, the term "multiple choice mandatory field" means a field on a form with a limited number of values. These fields are often used to determine the path that should be followed in a business process flow because they enumerate the possible values. This is in contrast to a field that has an infinite range of possible values (e.g., a description field).

This use of code to automate the interactions with the user interface 149 of the application under test 148 enables regression tests capable of detecting the current behavior or business logic of the application 148 to be automatically generated. As discussed above, the form is filled out with only the minimal amount of information in order to improve test coverage. In one embodiment the system 120 relies on historical information to populate the form (see: Scenario Generation: Historical precedence). However, such historical information may not indicate whether the particular field values were set by a user or by automated rules/workflows that implement the application 148 under test. If the test specifies information that actually is set by automation, then it is possible to cover up an issue during test execution with the automation that sets that field value, thus causing the test to miss a problem. This outcome can be avoided in the manner described hereinafter (See, e.g., Record Validation).

Scenario Generation: Historical Precedence

In order to ensure that the system 120 will be able to successfully traverse a process model of a business process or the like underlying the application 148, in one embodiment the test generation system 120 relies on historical precedence. This ensures that to the extent the application 148 under test includes data validation logic, the test generation system 120 is not simply inputting random data but rather is inputting data that is known to have been successfully submitted in the past. Information concerning valid inputs is collected by querying for historical records and/or audit data 192 (i.e., an example record with known valid field values originally created by the user associated to the current scenario), in case the validation rules are specific to the current user type.

Scenario Generation: Scenario Enrichment

Automatic test generation can map out possible paths through the system and further inform automated decisions as to the relevance of possible choices based on whether they cause changes in behavior of the application 148. The automatic test generation system 120 determines that a field is of particular significance and maps out each particular scenario. This process may be referred to as scenario enrichment. The underpinning of scenario enrichment is that certain actions taken actually represent an important branch, corresponding to conditional logic in the business process. This is only used for actions with a discrete (limited) number of possible inputs/actions.

As an example, the system 120 may determine that a field on a form called "Category", when set to different predetermined values, has the effect of causing additional fields to change their state, perhaps becoming mandatory or appearing or disappearing from the form altogether. Since in this case the "Category" field is displayed as a drop-down with a discrete list of possible values, it is possible for the system 120 to try them all and observe the resulting behavior of the application 148.

In contrast, when setting a free-text field to different values the system 120 may determine the particular field value to be of little significance to determining resulting business logic because no other fields on the form change their behavior dependent on the value in that field. These are examples of how the automated test generation system 120 can determine the importance of including a particular action in a test based on whether there is a corresponding reaction.

Scenario Generation: Scenario Description

Test steps for the application 148, which is written on a PaaS, can be described in the metaphors and abstractions of that PaaS. For example, "Open a form", "Set a field value", "Submit form" and "Validate Record" are instances of actions that might have specific meanings for a particular PaaS and that can be joined to create a test scenario. Application data as well as historical logging data and audit data 192 can be used to inform the test generation system 120 as to what scenarios are actually performed by users of a particular system. In one embodiment the test generator 160 records lists of scenarios, each consisting of a list of ordered steps. For each ordered step there is a list of expected outcomes serialized to the format necessary to execute in the test execution environment 130.

Below is an example from a simple serialized scenario consisting of field state and related assertions. The example specifies that a test should be generated by the test generator 160 for the table "incident" included within the application 148. A user with user id: 681b365ec0a80164000fb0b05854a0cd will be used for testing. Mandatory fields of "caller_id" and "short description" serve as a specification of both an assertion (the fields should be mandatory) and an action that will be taken, setting the values of those fields as per the "exampleValues" section. The entry "submittedSuccessfully" specifies that this should submit successfully using the default submit action (form button). The entries under "recordValidations" specify assertions to occur following submission of the expected values in the record after it has been saved to the database 134

```
{
    {
        "0":"incident",
        "1":"681b365ec0a80164000fb0b05854a0cd",
        "2":"dw_user_default",
        "3":"User's Default";
        "4":{
            "formInspectorData":{
                "visibles":[
                ],
                "mandatories":[
                    "caller_id",
                    "short_description"
                ],
                "readOnlies":[
                ],
                "exampleValues":{
                    "active":{
                        "value":"1",
                        "type":null
                    },
                    "approval":{
                        "value":"not requested",
                        "type":null
                    },
                    "caller_id":{
```

-continued

```
        "value":"46c1293aa9fe1981000dc753e75ebeee",
        "type":"reference"
    },
    "category":{
        "value":"inquiry",
        "type":"string"
    },
    "child_incidents":{
        "value":"0",
        "type":"integer"
    },
    "company":{
        "value":"31bea3d53790200044e0bfc8bcbe5dec",
        "type":null
    },
    "escalation":{
        "value":"0",
        "type":null
    },
    "impact{:
        "value':"3",
        "type":null
    },
    "incident_state":{
        "value":"1",
        "type":"integer"
    },
    "knowledge":{
        "value":"0",
        "type":null
    },
    "made_sla":{
        "value":"1",
        "type":null
    },
    "notify":{
        "value":"1",
        "type":"integer"
    },
    "opened_at":{
        "value":"2018-11-27 00:02:03",
        "type":null
    },
    "opened_by":{
        "value":"681b365ec0a80164000fb0b05854a0cd",
        "type":null
    },
    "priority":{
        "value":"5",
        "type":null
    },
    "reassignment_count":{
        "value":"0",
        "type":null
    },
    "reopen_count":{
        "value":"0",
        "type":"integer"
    },
    "severity":{
        "value":"3",
        "type":"integer"
    },
    "short_description":{
        "value":"SAP Sales app is not accessible",
        "type":null
    },
    "state":{
        "value":"1",
        "type":null
    },
    "upon_approval":{
        "value":"proceed",
        "type":null
    },
    "upon_reject":{
        "value":"cancel",
        "type":null
    },
```

```
            "urgency":{
                "value":"3",
                "type":null
            }
        },
        "submittedSucessfully":true,
        "fieldsSet":{
            "short_description":{
                "type":null,
                "value":"SAP Sales app is not accessible",
                "setValueRound":0
            },
            "caller_id":{
                "type":"reference",
                "value":"46c1293aa9fe1981000dc753e75ebeee",
                "setValueRound":0
            }
        },
        "skipReason":null
    },
    "recordAnalysis":{
        "relatedRecords":{
        },
        "current":{
            "table":"incident",
            "fields":{
                "active":{
                    "field":"active",
                    "value":"1",
                    "type":"boolean"
                },
                "approval":{
                    "field":"approval",
                    "value":"not requested";
                    "type":"string"
                },
                "caller_id":{
                    "field":"caller_id",
                    "value":"46c1293aa9fe1981000dc753e75ebeee",
                    "type":"reference"
                },
                "category":{
                    "field":"category";
                    "value":"inquiry";
                    "type":"string"
                },
                "child_incidents":{
                    "field":"child_incidents",
                    "value":"0",
                    "type":"integer"
                },
                "company":{
                    "field":"company",
                    "value":"31bea3d53790200044e0bfc8bcbe5dec",
                    "type":"reference"
                },
                "escalation":{
                    "field":"escalation";
                    "value":"0",
                    "type":"integer"
                },
                "impact":{
                    "field":"impact",
                    "value":"3",
                    "type":"integer"
                },
                "incident_state":{
                    "field":"incident_state",
                    "value":"1",
                    "type":"integer"
                },
                "knowledge":{
                    "field":"knowledge",
                    "value":"0",
                    "type":"boolean"
                },
                "made_sla":{
                    "field":"made_sla",
                    "value":"1",
```

```
        "type":"boolean"
    },
    "notify":{
        "field":"notify";
        "value":"1",
        "type":"integer"
    },
    "opened_by":{
        "field":"opened_by",
        "value":"681b365ec0a80164000fb0b05854a0cd",
        "type":"reference"
    },
    "priority":{
        "field":"priority",
        "value":"5",
        "type":"integer"
    },
    "reassignment_count":{
        "field":"reassignment_count";
        "value":"0",
        "type":"integer"
    },
    "reopen_count":{
        "field":"reopen_count",
        "value":"0",
        "type":"integer"
    },
    "severity":{
        "field":"severity",
        "value":"3",
        "type":"integer"
    },
    "short_description":{
        "field":"short_description";
        "value":"SAP Sales app is not accessible",
        "type":"string"
    },
    "state":{
        "field":"state";
        "value":"1",
        "type":"integer"
    },
    "sys_class_name":{
        "field":"sys_class_name",
        "value":"incident",
        "type":"sys_class_name"
    },
    "sys_created_by":{
        "field":"sys_created_by",
        "value"::"itil",
        "type":"string"
    },
    "sys_domain":{
        "field":"sys_domain",
        "value":"global",
        "type":"domain_id"
    },
    "sys_domain_path":{
        "field":"sys_domain_path",
        "value":"/",
        "type":"domain_path"
    },
    "sys_mod_count":{
        "field":"sys_mod_count",
        "value":"0",
        "type":"integer"
    },
    "sys_updated_by":{
        "field":"sys_updated_by",
        "value":"itil",
        "type":"string"
    },
    "upon_approval":{
        "field":"upon_approval",
        "value":"proceed",
        "type":"string"
    },
    "upon_reject":{
        "field":"upon_reject",
```

```
            "value":"cancel",
            "type":"string"
          },
          "urgency":{
            "field":"urgency",
            "value":"3",
            "type":"integer"
          }
        }
      },
      "valid":true
    }
  }
}
```

Scenario Generation: False Positive Elimination and Scenario Reliability

In order to be sure that an automatically generated description of a business process is valid to be used as an automated test, in one embodiment it is necessary to eliminate those things which are non-deterministic in nature relative to the action being tested. In order to do this the test generator 160 may generates its description of current behaviors multiple times prior to the change and cull from its descriptions anything which varies in the multiple descriptions generated before the change. An example of a change that would be culled is a process model or business logic dictating that the current date-time be written to a record. Since every subsequent run of the test will have a new value for date-time field, this field is not something that should be asserted as part of a test. As a consequence, in one embodiment the test generation phase is preliminarily executed multiple times and any fields or other items that vary among these executions are removed from the assertion list to be utilized during the actual test of the application 148. The finalized description of the process model for the application 148 that has had non-deterministic data removed is what is ultimately used for test creation.

An additional measure taken to ensure that scenarios are accurate is "negative assertions". Negative assertions specify when during scenario generation the test generation system 120 detects a failure. When supported by the targeted text execution environment 130, the test generation system 120 will assert that the scenario should fail. An example would be where clicking the submit button will result in a failure to submit, perhaps because of an accounted for data-validation rule. The purpose of this additional measure is to avoid generating tests that would fail due to shortcomings in the ability of the test generation system 120 to determine some required detail of the scenario.

In some cases Field Type Specific Value Transformations are used to ensure scenarios are valid. An example is for date fields where values are relativized to the current date and time. This helps with a field validation on these fields that may be looking for a date in the future or in the past. Relativizing means taking the date in the field and finding and off-set from the time when the record was created (+/−some number of seconds) and then applying the offset to set the field in the scenario.

Figure 13:
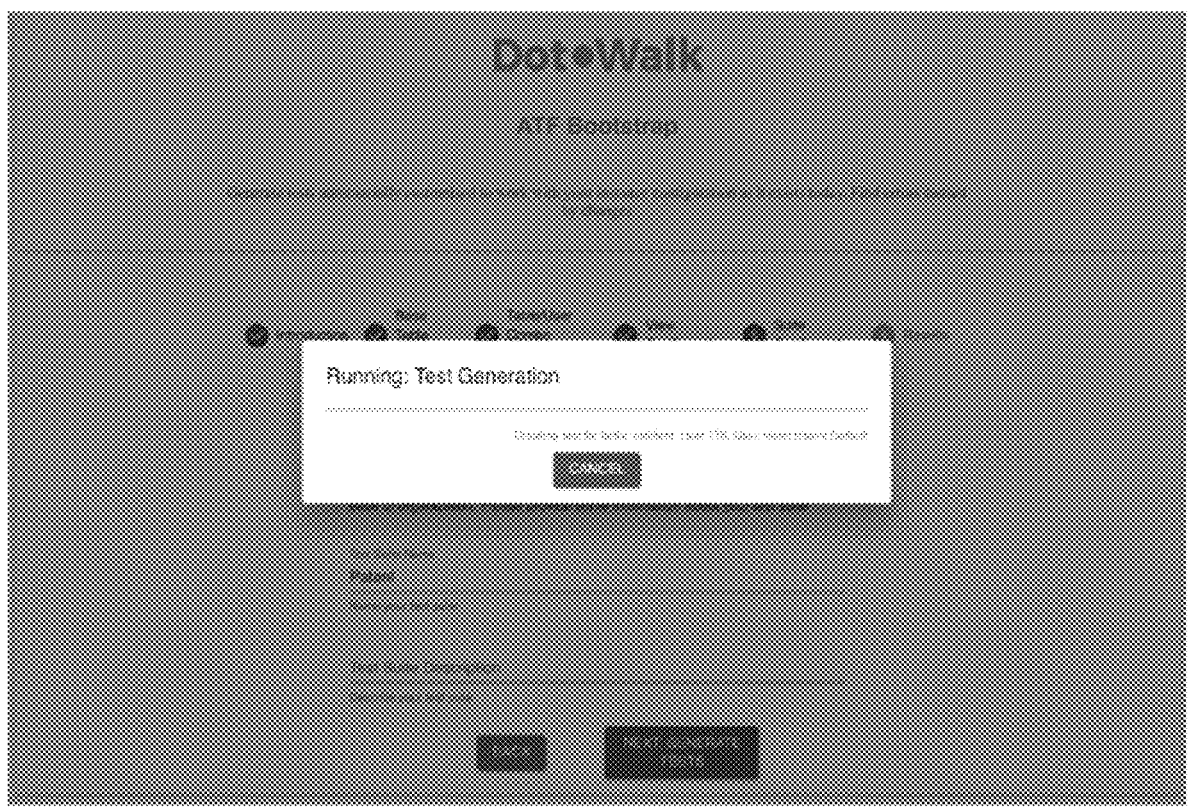
FIGS. 13 and 14 are screenshots of exemplary user interfaces presented to a user during the period in which a test generator is actually performing processing operations to generate a test suite.
Figure 14:
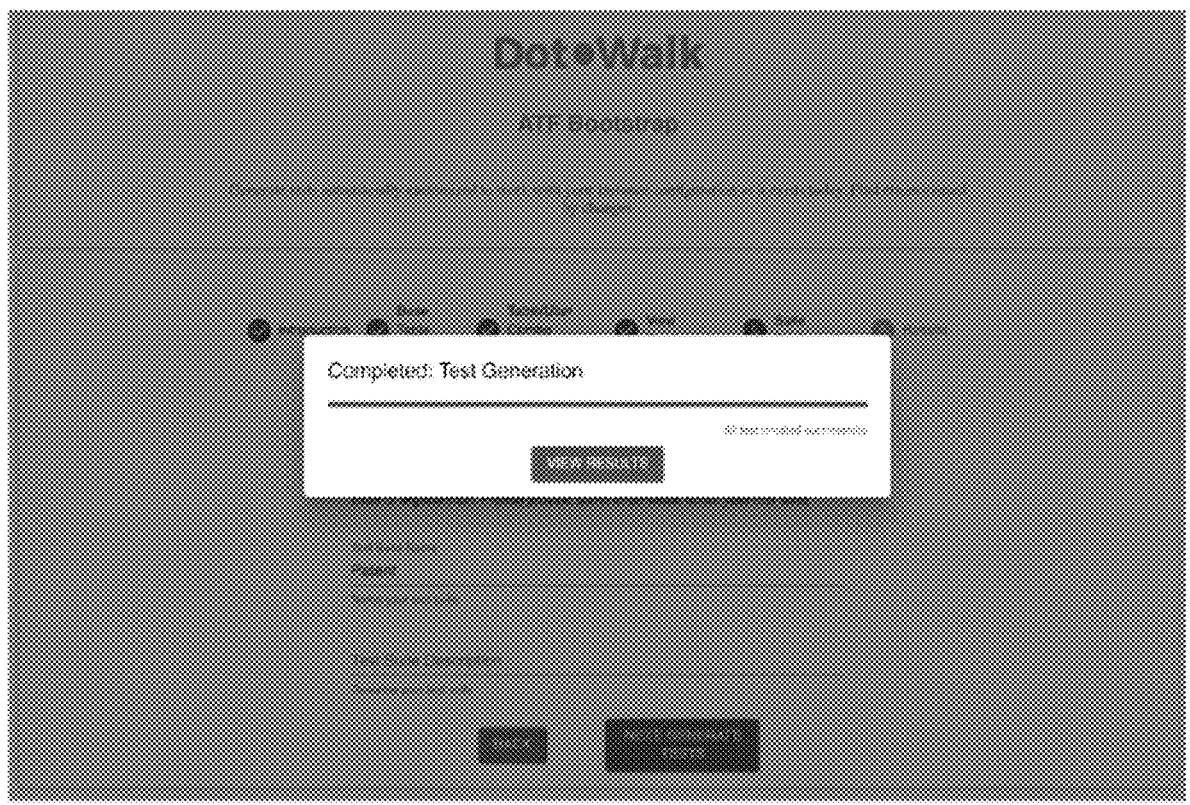
Figure 15:
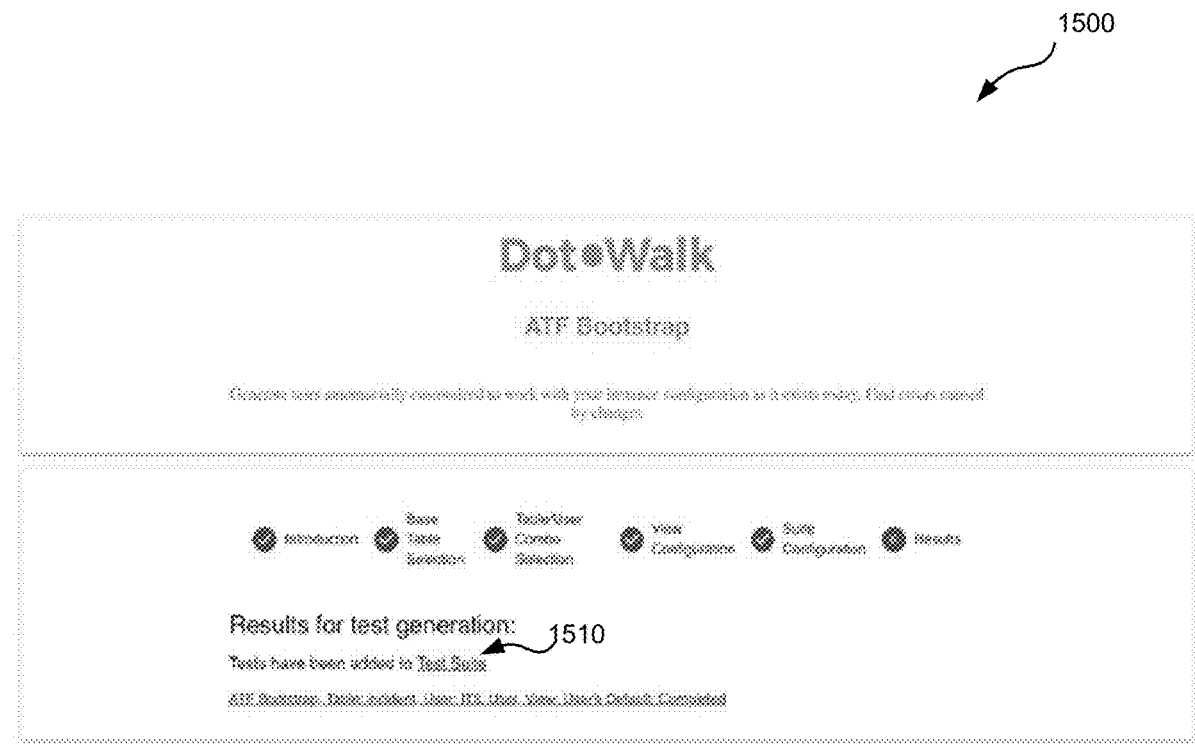
FIG. 15 is a screenshot of an exemplary user interface signaling that test generation operations have been completed and a set of tests have been added to a test suite.
Figure 16:
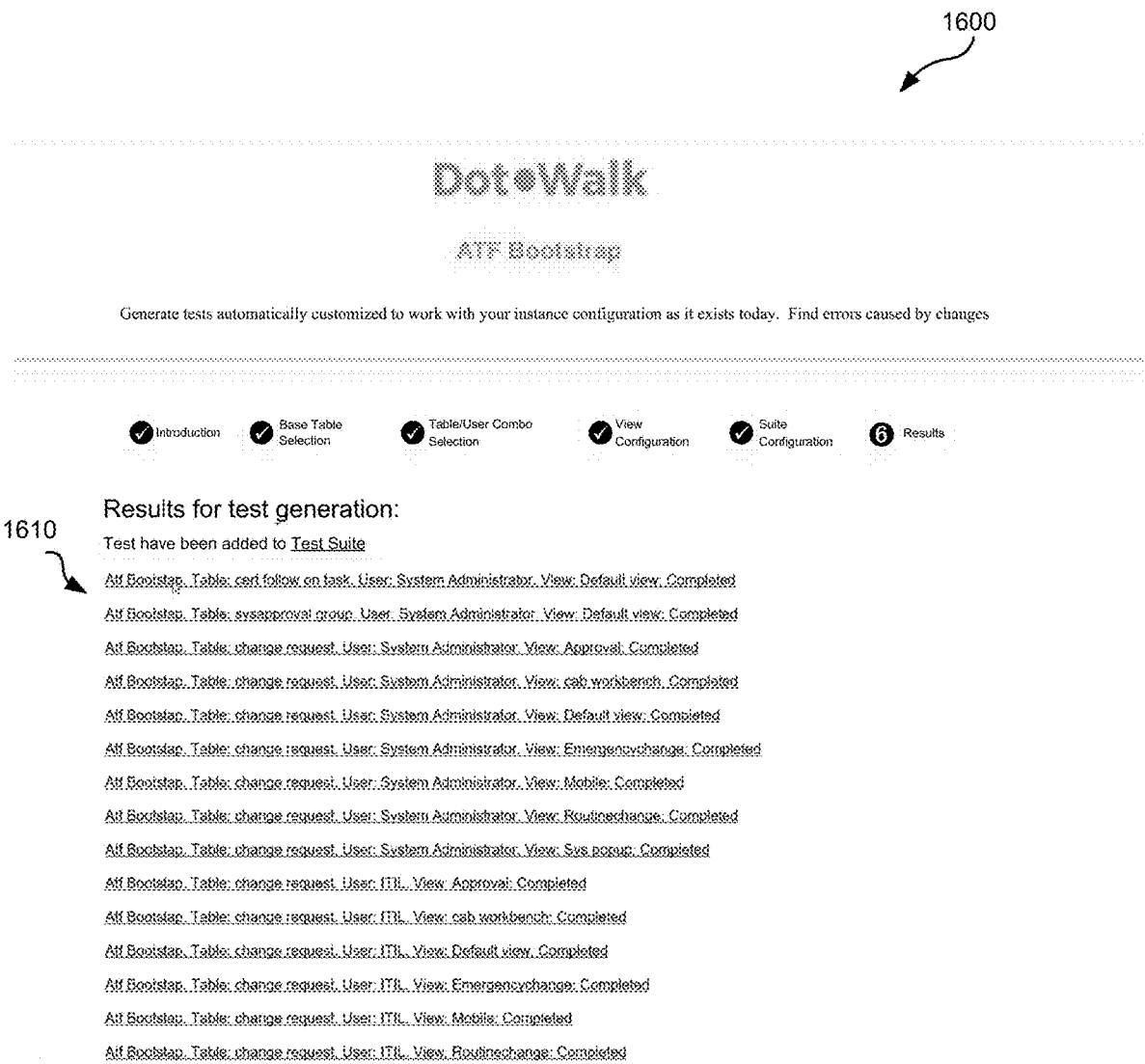
FIG. 16 is a screenshot of an exemplary user interface containing a list of tests included within the test suite identified in FIG. 15.

FIGS. 13-16 are screenshots of exemplary user interfaces generated by the test specification/generation user interface 150 during the scenario generation phase 420. Specifically, FIGS. 13 and 14 are screenshots of exemplary user interfaces presented to a user during the period in which the test generator 160 is actually performing processing operations to generate a test suite. FIG. 15 is a screenshot of an exemplary user interface signaling that these test generation operations have been completed and a set of tests have been added to a test suite 1510 named "Test Suite". FIG. 16 is a screenshot of an exemplary user interface 1600 containing a list of tests 1610 included within the test suite 1510.

Test Execution

Test execution may be performed either by an existing test execution environment 130 separate from the automated test generation system 120 or within the automated test generation system 120

Figure 17:
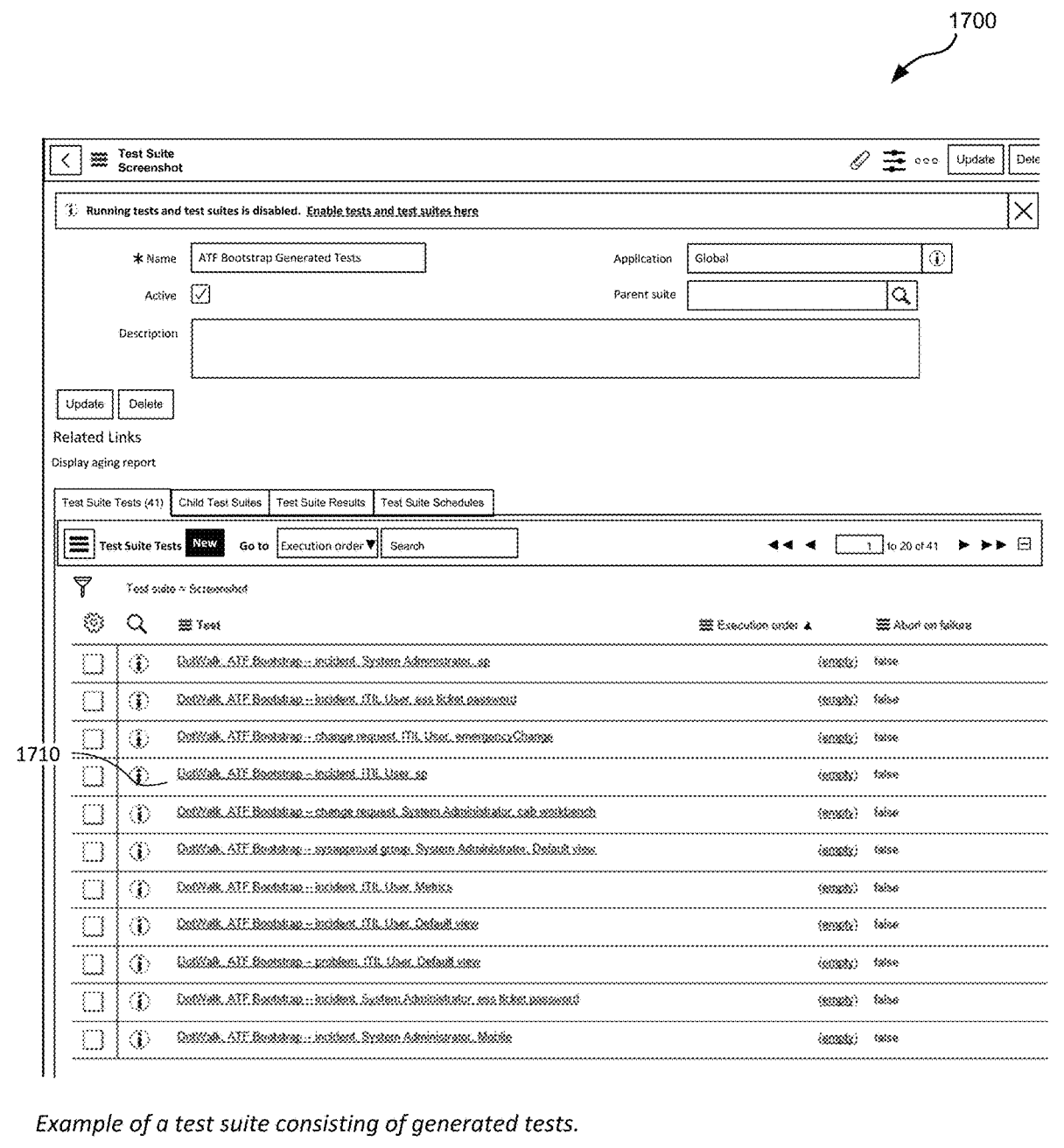

FIG. 17 is a screenshot of a user interface 1700 produced by the test generation user interface 150 which illustrates a test suite consisting of generated tests produced by the test generation system 120.

Figure 18:
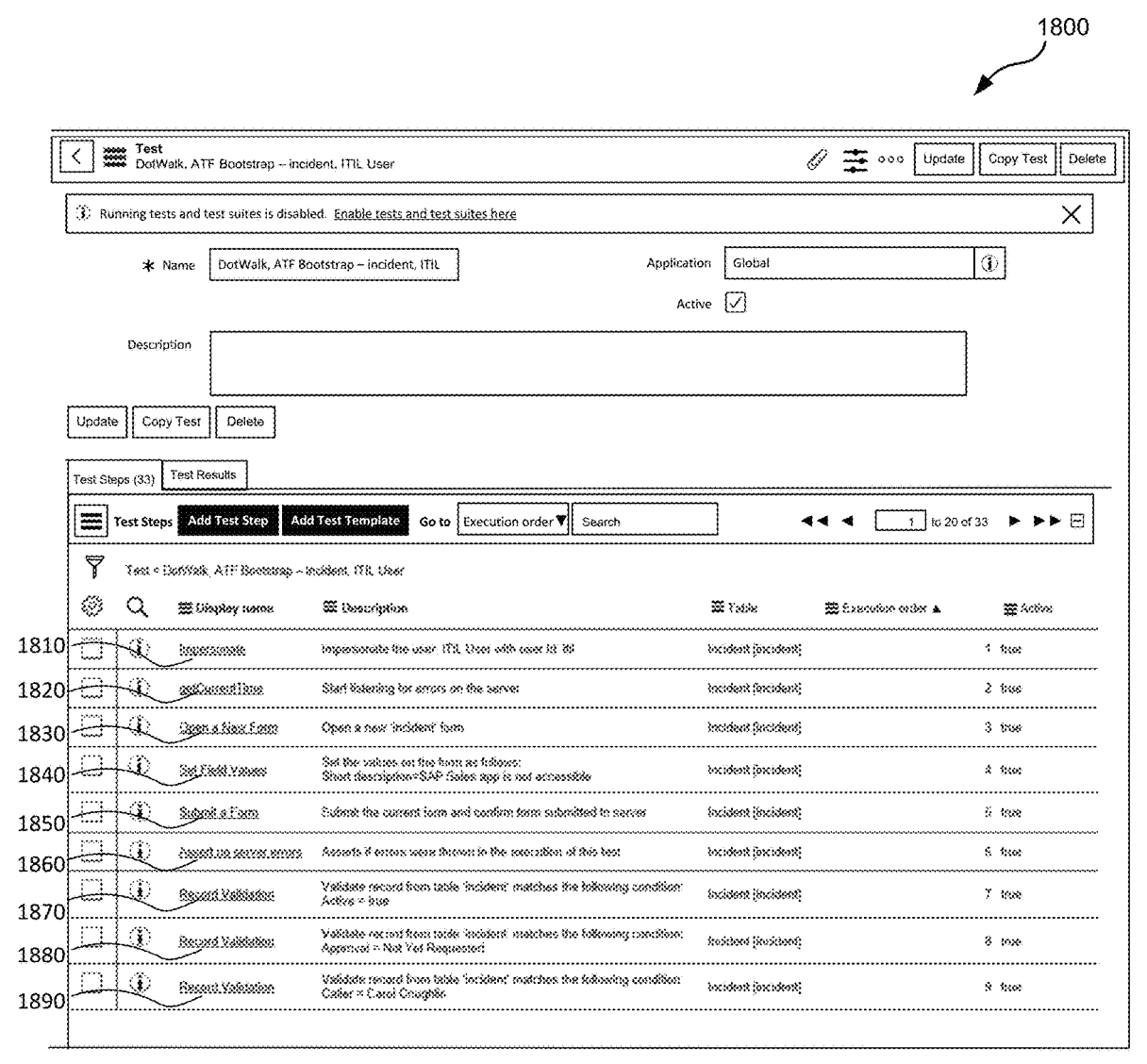

FIG. 18 is a screenshot of a user interface 1800 produced by the test generation user interface 150 which shows an example of a specific test 1710 included with test suite of FIG. 17. The test 1710 represented by the user interface 1800 is defined in a domain specific language (DSL) and consists of a set of steps (database record per step) performed with respect to the table Incident in the application 148 under test. The test represented by FIG. 18 is initiated by an initial Impersonate step 1810 which involves logging in to the application 148 under test by impersonating a user. Next, a getCurrentTime step 1820 is performed in which the system 120 begins listening for errors on the server 134. In an Open a New Form step 1830 a new "Incident" form opened. The values on the "Incident" form are then set consistent with the condition that "SAP sales app is not accessible" (stage 1840). The completed Incident form is then submitted in a Submit a Form step 1850. If errors were thrown in connection with the execution of the test of FIG. 18, then Assert no server errors is asserted (stage 1860). The test concludes with three Record Validation steps 1870, 1880, 1890 during which it is determined whether various records from the table Incident match certain conditions (i.e., "Active=true", "Approval=Not Yet Requested" and "Caller=Carol Coughlin").

FIG. 19 is a screenshot of a user interface 1900 produced by the test generation user interface 150 which shows a detailed view of test step Record Validation 1870 included within the test shown in FIG. 18.

Test Execution: Within the Test Generation System

The test generation system 120 is able to function as a test execution environment 130 when it generates the description (see "Simple serialized scenario example" above) before and after a change in the PaaS underlying the application 148 under test and then compares the results. If any action that is part of a given scenario results in a different assertion list when the scenario is executed on different PaaS, then a test failure is deemed to exist. This is because existing business processes have been found to have changed following a change in the platform. In one embodiment the process for noticing a difference is the same as that used for detecting non-deterministic data in the assertion list. Additionally, however, during test execution the system 120 deals differently with actions. During the test generation phase 420, when the system 120 determines that an action isn't possible the resulting test should assert this negative (see "Scenario Generation: False positive elimination and scenario reliability").

Test Execution: Within a Separate Execution Environment

While it is possible for the test generation system 120 to also act as the test execution environment 130, it is generally more advantageous to use a pre-existing test execution environment. One reason this may be advantageous is that by using a pre-existing environment as the test execution environment 130 a testing professional may be able to take advantage of consolidated and robust error reporting. Additionally, if imported into a pre-existing testing framework, the tests generated by the system 120 become editable and maintainable by testing professionals. They can thus be augmented with additional steps and functionality beyond what was generated by the testing system 120. This is particularly relevant when the test generation system 120 is being used to bootstrap automated tests in cases in which the application 148 was implemented without writing automated tests, thus requiring that automated tests be generated after the application 148 has been developed and otherwise implemented.

The data collected during generation, actions and corresponding assertions, about the behavior of the system can be used to generate tests for a variety of different test execution environments. Most automated testing frameworks currently in existence provide the ability to author a test as computer code by concatenating strings. Through the use of code generation a test can be automatically written in the testing framework requisite programming language that implements the testing steps and assertions. Additionally, the test may be implemented as an automatically created test in a Domain Specific Language (DSL). The DSL may operate at a higher level of abstraction from a traditional programming language and have specialized syntax or even user interfaces for describing a test. These can also be generated programmatically. The DSL for the tests need not be string based. If, for a given execution environment, the creation of tests is mediated through a user interface that writes database records, then the test generation may consist of writing structured data to a database. See, e.g., the screenshot of FIG. 17, which lists example tests from an exemplary PaaS.

FIG. 20 is a screenshot of a user interface 2000 generated by the test generation user interface 150 that is associated with test execution within a separate test execution environment 130.

Test Execution: Error Detection

Thus far the automated test generation system 120 and associated test execution process has been described in terms of its ability to detect behavior differences: "When you do this, this other thing happens". Another important determination of testing success is system errors. System errors occur when an exception is thrown from the code or underlying runtime for the PaaS. Net new errors are recorded as test failures in addition to behavioral changes. The two may go hand in hand; that is, the system changed behavior because an underlying error occurred in the code. Errors can be detected by accessing logs either via an API or scraping logs. The system 120 automatically detects errors in the Web browser 144 by overriding the JavaScript API's for writing log messages prior to beginning the test and then listening for errors. A similar approach may be used on the server 134 and, additionally, log tables/files may be directly read with automation.

Any errors detected during test generation are simply recorded. Any errors detected during test execution are compared against those detected during test generation and in one embodiment the test is failed if the error is net-new.

While the detection of errors during a test execution is known, the ability to generate a test automatically and then detect errors as described herein is novel and important since this capability provides enhanced test coverage in addition to the detection of behavior changes with explicit assertions.

Record Actions and Validation

In addition to the assertion criteria already mentioned, the automated test generation system 120 also observes for side-effects that can be used as assertion criteria. These are parts of the business process implemented by the application 148 which do not manifest until after a form is submitted. These include a record 170 or object 168 directly resulting from the submission of the form as well as other records 170 besides the one upon which actions are being directly taken. In order to detect side-effects to other records objects 168, the system 120 will preferably follow referential data in the database 134. In particular, when generating tests the test generation system 120 will observe any records 168 referenced by a foreign key relationship from the record under test. It will also query for any foreign key relationships pointing back to the record under test.

Record Actions and Validation: Validation of Record Under Test

The "record under test" is the primary record 170 corresponding to the form of the application 148 that was open and submitted during test generation and later test execution. During test generation, a set of assertions are generated for what field values should be expected following submission of the record under test. In one embodiment the same process is followed twice during test generation to submit a record. The field values resulting from these two runs are then compared. Any field values that differ between the two runs are not used in an assertion as these are determined to be non-deterministic in nature. An example of a field that is determined to be non-deterministic would be a field tracking the time the record was created. The time will be different for each subsequent submission and thus any given time value will not be repeatable. In one embodiment the set of assertions is compiled into steps, at the end of the generated test, which query the record just inserted by the actions taken within the UI and assert each field value on that record.

Figure 21:
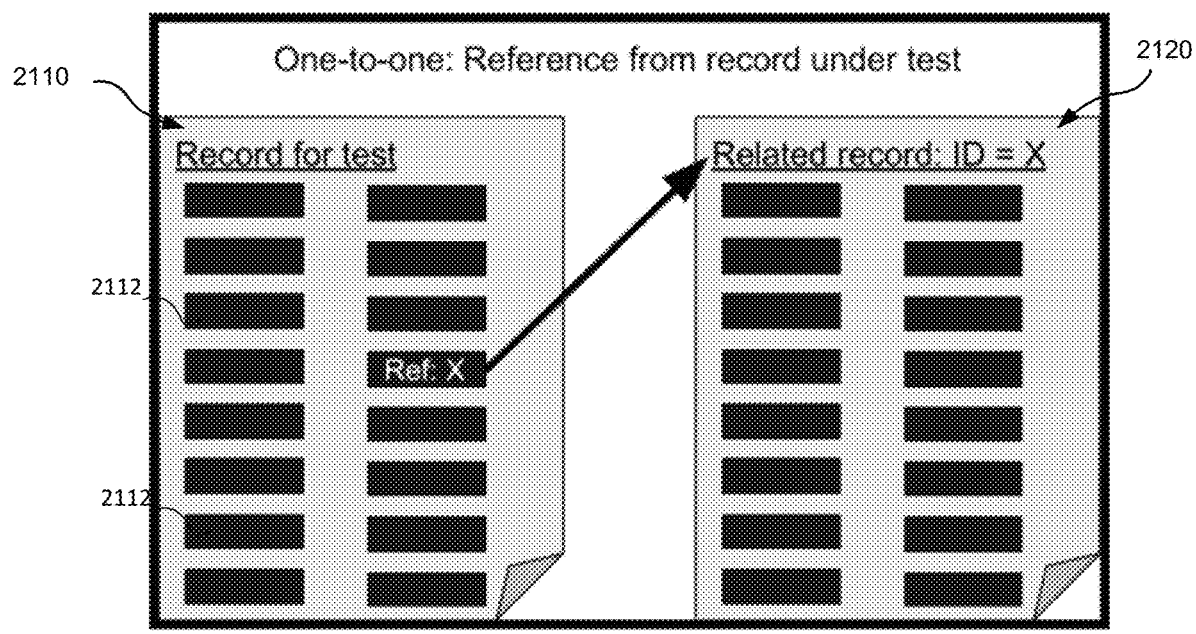
FIG. 21 illustrates a one-to-one relationship between a record under test and a related record referenced by the record under test.

Record Actions and Validation: One-to-One Relations, Reference from Record Under Test Attention is now directed to FIG. 21, which illustrates a one-to-one relationship between a record under test 2110 and a related record 2120 referenced by the record under test. Referring to FIG. 21, one to one relations for records referenced from the record under test 2110 are detected and validated. For all fields 2112 on the record being tested, if the field 2112 stores a foreign key relationship, that record is queried. If the record was updated or inserted as a side-effect of the submission of the "Record for test", then the fields are recorded. Whether the record was created or updated can be determined by looking at "Creation date", "Last updated date" or audit data. During the second generation (scenario is repeated at least twice as noted previously) the fields are also recorded and then compared to what was recorded for the previous run. Any fields found to vary are culled from the list of recorded fields. This is necessary to remove any non-deterministic values for which a value should not be inserted. For example, a field for the created date cannot be part of the record assertion because it will vary for each record. This data becomes an assertion/s in the scenario. During test execution, the test for the scenario will assert that the field contains a valid reference. If the record was found to have been created then the field values are asserted based on the list of field values observed to be deterministic in nature at test creation time. If the record was only updated then only fields with values that changed as part of that update, as determined by referencing audit data (see Architecture: Historical data, audit logs and record created/updated date stamps) will be recorded.

Figure 22:
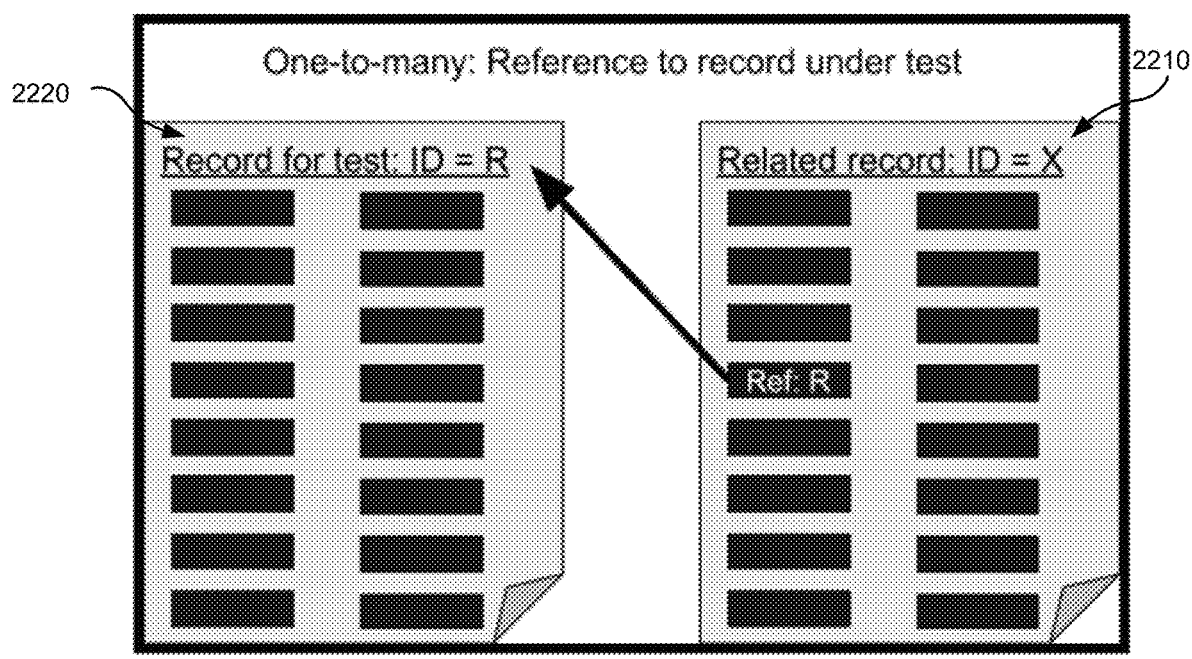
FIG. 22 illustrates a one-to-many relationship between related records and a record under test.

Record Actions and Validation: One-to-Many Relations, Reference to Record Under Test Attention is now directed to FIG. 22, which illustrates a one-to-many relationship between related records 2210 and a record under test 2220. In particular, FIG. 22 shows that one-to-many relations from related records 2210 referencing the record under test 2220 are also detected and validated. In order to validate records related by a one to many relationship, the test generation system 120 needs to identify deterministic characteristics for these records; that is, values that will be present consistently for executions of the to-be generated test. In one embodiment this works as follows. The test generator 160 runs the steps that will result in submission of a record twice. Each time every field on every table that stores a reference (foreign key relationship) back to the table of the record under test 2220 is queried. The query looks for the ID to be the record under test 2220. The count of records is added to the list of assertions and the eventual test will later assert that count. Additionally, all of the field values are stored. Upon the second run, still part of single test generation, the test generator 160 performs the same queries again. In cases where there are multiple records 2210 referencing the record under test 2220, from the same table and field combination, the test generator 160 needs to match like records between runs. This is accomplished by comparing each record from each execution run with all records from the other generation run. The output of this comparison is a similarity score. Each record is matched to the record with which it is determined it has the highest similarity scoring. The similarity scoring can be ascertained using string comparison scoring like that implemented by, for example: https://github.com/mhutter/string-similarity. After determining the most similar record, any differences between the matched records are culled so that the assertion only contains those fields which were the same between the two scenario generation runs. The resulting serialized record is used to create an assertion for the test for any fields that remain. The assertion at test execution time is implemented as a query against the related table, with each field assertion included as a term in the query's where clause.

Record Actions and Validation: Many-to-Many Relations to Record Under Test

Validation of many to many tables happens with a recursively executed combination of the one-to-one and one-to-many validations. For every record detected via the process for one-to-one or one-to-many, the system 120 then also checks its relations. In this way it is possible to map out all the side-effects that resulted from the action taken on the original object 168. This is illustrated by the following example. Consider that the record under test may be part of a request for purchase application. Upon submission of the request for purchase, multiple records 170/objects (one-to-many) are inserted into a database tracking individual approvals necessary before the request is approved, with each approval having a reference back to the purchase request. Each approval may trigger the sending of an email which is logged to a table where the email links back to the corresponding approval record. Because the discovery of related records operates recursively, the system 120 is able to detect the relationship all the way to the email log record (not just to the approval).

Related Uses Beyond Functional Testing

Performance Testing

In addition to validating that an application 148 under test is working functionally after an upgrade to the SaaS Platform, the approach disclosed herein may be leveraged for the purposes of performance testing. Specifically, by adding test steps that implement timers to measure the time required by the application 148 to execute the generated test scenarios, the system 120 may be configured to provide validation that the scenario completes without a regression in terms of the speed with which the user interface 149 renders and responds. For this purpose the test generation system 120 executes the same action multiple times, and collects multiple samples of time for scenario before and after in order to correct for variability in the results.

While various embodiments have been described above, it should be understood that they have been presented by way of example only, and not limitation. They are not intended to be exhaustive or to limit the claims to the precise forms disclosed. Indeed, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method of mapping a process model of a software application executed by a hosting platform, the software application being based on a plurality of records, the method comprising:
   receiving information specifying a plurality of tests to be created;
   generating a plurality of test specifications for the plurality of tests;
   initiating, by a test generator executing in a Web browser upon completion of each test specification of the plurality of test specifications, a session of the software application for an impersonated user wherein the impersonated user corresponds to an impersonation of a human user and wherein the test generator is configured to open one or more user interface pages of the software application in the Web browser;
   automatically simulating, through one or more application programming interface (API) calls made by the test generator during the session, a series of actions taken by the impersonated user with respect to the one or more user interfaces pages wherein the series of actions are included within a plurality of scenarios automatically generated by the test generator based upon the test specification and wherein the one or more user interface pages include at least one form and the series of actions includes opening the form wherein the plurality of records include a record under test corresponding to the form;
   gathering information identifying a plurality of user interface fields of the form, the plurality of user interface fields including at least one visible field and one or more mandatory fields;
   determining if values have been set for the one or more mandatory fields;
   setting, through one or more other API calls executed during the session one or more of the plurality of user interface fields to known values and submitting the form to the software application subsequent to the setting of the one or more of the user interface fields;
   gathering field-related information from the record under test resulting from the setting of the plurality of user interface fields;
   gathering record-related information corresponding to one or more effects on the record under test and on a related record referenced by the record under test resulting from the submission of the form; and
   determining the process model based upon the field-related information and the record-related information.

2. The method of claim 1 wherein the gathering information dentifying the plurality of user interface fields includes gathering information identifying one or more read-only fields.

3. The method of claim 1 wherein the gathering information identifying the plurality of user interface fields includes identifying one or more available actions.

4. The method of claim 1 further including identifying current field values of ones of the plurality of user interface fields, the current field values being included within the field-related information.

5. The method of claim 1 wherein the setting of the one or more of the fields includes setting only the one or more mandatory fields.

6. The method of claim 1 wherein the test specification includes information specifying which objects of the software application are to be tested with respect to at least one of a set of users or a set of user groups.

7. The method of claim 1 wherein the known values are obtained from historical data relating to prior usage of the software application.

8. A computer-implemented method of automated testing of a software application executed against a hosting platform, the software application being based on a plurality of records, the method comprising:
   receiving information specifying a plurality of tests to be created;
   generating a plurality of test specifications for the plurality of tests;
   initiating, by a test generator executing in a Web browser upon completion of each test specification of the plurality of test specifications, a session of the software application for an impersonated user wherein the impersonated user corresponds to an impersonation of a human user and wherein the test generator is configured to open one or more user interface pages of the software application in the Web browser;
   determining a process model of the software application based upon user interface (UI) field-related information and record-related information obtained by automatically simulating, through one or more application programming interface (API) calls made by the test generator during the session, a series of actions taken by the impersonated user with respect to the one or more user interface pages when-the software application is executing on a first version of the hosting platform wherein the series of actions are included within a plurality of scenarios automatically generated by the test generator based upon the test specification and wherein the one or more user interface pages include at least one form and the series of actions include opening the form wherein the plurality of records include a record under test corresponding to the form, the determining the process model including (i) gathering information identifying a plurality of user interface fields of the form including at least one visible field and one or more mandatory fields and gathering record-related information corresponding to one or more effects on the record under test and on a related record referenced by the record under test, and (ii) determining if values have been set for the one or more mandatory fields;
   automatically generating a test of the software application based upon the process model; and
   testing the software application in accordance with the test when the software application is executing on a second version of the hosting platform.

9. The method of claim 8 wherein the determining the process model further includes:
- identifying, through one or more other API calls, the plurality of user interface fields of the form, the series of actions further including setting one or more of the plurality of user interface fields to known values and submitting the form to the software application subsequent to the setting of the one or more of the user interface fields;
- gathering the field-related information wherein the field-related information results from the setting of the plurality of user interface fields;
- gathering the record-related information wherein the record-related information corresponds to one or more effects on the plurality of records resulting from the submission of the form.

10. The method of claim 9 wherein the identifying the plurality of user interface fields further includes identifying one or more read- only fields.

11. The method of claim 9 wherein the identifying the plurality of user interface fields includes identifying one or more available actions.

12. The method of claim 9 further including identifying current field values of ones of the plurality of user interface fields, the current field values being included within the field-related information.

13. The method of claim 9 wherein the setting of the one or more of the fields further includes setting only the one or more mandatory fields.

14. The method of claim 9 wherein the setting of the one or more of the user interface fields includes using known values obtained from historical data relating to prior usage of the software application.

15. The method of claim 8 wherein the test specification incudes information specifying which objects of the software application are to be tested with respect to at least one of a set of users or a set of user groups.

16. The method of claim 8 wherein the testing includes executing a plurality of pass/fail tests.

17. The method of claim 8 wherein the testing includes:
- recording test results resulting from the testing of the software application; and
- detecting a regression in the software application by identifying one or more differences between the test results and initial simulation results comprised of the UI field-related information and the record-related information.

18. The method of claim 8 wherein the determining the process model further includes identifying, through one or more other API calls, the plurality of user interface fields of the form.

19. The method of claim 18 further including determining ones of the plurality of user interface fields corresponding to the one of more mandatory fields wherein the series of actions includes setting only the mandatory fields to known values.

20. The method of claim 8 wherein the determining the process model further includes:
- setting one or more of the plurality of user interface fields to known values and submitting the form to the software application as part of a first test run;
- gathering first field-related information wherein the first field-related information results from the setting of the plurality of user interface fields during the first test run;
- setting the one or more of the plurality of user interface fields to the known values and submitting the form to the software application as part of a second test run;
- gathering second field-related information wherein the second field-related information results from the setting of the plurality of user interface fields during the second test run;
- comparing field values for the plurality of user interface fields resulting from the first test run and the second test run;
- generating the process model based at least in part upon the comparing the field values.

21. The method of claim 20 wherein the generating includes excluding from the process model ones of the plurality of user interface fields for which the field values differed between the first test run and the second test run.

* * * * *

UNITED STATES PATENT AND TRADEMARK OFFICE
CERTIFICATE OF CORRECTION

| | | |
|---|---|---|
| PATENT NO. | : 11,449,370 B2 | |
| APPLICATION NO. | : 16/709576 | |
| DATED | : September 20, 2022 | |
| INVENTOR(S) | : Jared Matthew Laethem | |

It is certified that error appears in the above-identified patent and that said Letters Patent is hereby corrected as shown below:

In the Claims

Claim 2, Line 2 Column 28, Line 2: Replace "dentifying" with --identifying--

Signed and Sealed this
Seventeenth Day of January, 2023

Katherine Kelly Vidal
*Director of the United States Patent and Trademark Office*